United States Patent
Whiting et al.

(10) Patent No.: US 10,832,630 B2
(45) Date of Patent: *Nov. 10, 2020

(54) PROVIDING A DISPLAY BASED ELECTRONIC SURVEY

(71) Applicant: Qualtrics, LLC, Provo, UT (US)

(72) Inventors: Jeffrey Scott Whiting, Salem, UT (US); Brett Bradley Campbell, Orem, UT (US); Lance Thomas Winward, America Fork, UT (US)

(73) Assignee: QUALTRICS, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,157

(22) Filed: Mar. 29, 2019

(65) Prior Publication Data

US 2019/0228736 A1 Jul. 25, 2019

Related U.S. Application Data

(63) Continuation of application No. 14/816,983, filed on Aug. 3, 2015, now Pat. No. 10,325,568.

(51) Int. Cl.
*G06F 3/048* (2013.01)
*G09G 5/00* (2006.01)
*H04L 29/08* (2006.01)
*G06F 3/0482* (2013.01)
(Continued)

(52) U.S. Cl.
CPC ........... *G09G 5/005* (2013.01); *G06F 3/0482* (2013.01); *G06F 40/14* (2020.01); *G06Q 30/0203* (2013.01); *H04L 67/02* (2013.01); *H04L 67/2823* (2013.01); *G09G 2340/14* (2013.01); *G09G 2340/145* (2013.01);
(Continued)

(58) Field of Classification Search
None
See application file for complete search history.

(56) References Cited

U.S. PATENT DOCUMENTS 8,606,645 B1 12/2013 Applefeld
8,666,978 B2 3/2014 Moganti et al.
9,581,457 B1 2/2017 Meredith et al.
(Continued)

OTHER PUBLICATIONS

U.S. Appl. No. 14/743,745, filed May 31, 2019, Office Action.
(Continued)

*Primary Examiner* — Thanh T Vu
(74) *Attorney, Agent, or Firm* — Keller Jolley Preece

(57) ABSTRACT

Embodiments of the present disclosure relate to providing electronic survey content to a user in accordance with a particular layout. In particular, a survey system facilitates providing survey questions of an electronic survey to a user within a display area of a client device in accordance with a determined layout based on one or more features of the display area. For example, the survey system associates a plurality of layouts with one or more survey questions. Further, the survey system provides the survey questions and associated layout to a client device for presentation to a user. The client device identifies one or more features of a display area and determines a layout from the plurality of layouts to use in providing the survey question(s) to the user. Further, the client device provides one or more survey questions to a user within the display area in accordance with a determined layout.

20 Claims, 13 Drawing Sheets

(51) Int. Cl.
*G06Q 30/02* (2012.01)
*G06F 40/14* (2020.01)

(52) U.S. Cl.
CPC ... *G09G 2354/00* (2013.01); *G09G 2370/027* (2013.01); *G09G 2370/042* (2013.01)

(56) References Cited

U.S. PATENT DOCUMENTS

| | | | |
|---|---|---|---|
| 9,721,386 | B1 | 8/2017 | Worley et al. |
| 10,176,640 | B2 | 1/2019 | Tierney et al. |
| 2002/0036649 | A1 | 3/2002 | Kim et al. |
| 2002/0128898 | A1 | 9/2002 | Smith et al. |
| 2007/0078720 | A1 | 4/2007 | Ravikumar et al. |
| 2008/0114845 | A1* | 5/2008 | Rao ................ G06Q 30/02 709/206 |
| 2011/0196801 | A1 | 8/2011 | Ellis et al. |
| 2011/0231424 | A1 | 9/2011 | Avdanina |
| 2011/0256520 | A1 | 10/2011 | Siefert |
| 2012/0011006 | A1 | 1/2012 | Schultz et al. |
| 2012/0116878 | A1 | 5/2012 | Falk et al. |
| 2012/0192235 | A1 | 7/2012 | Tapley et al. |
| 2012/0237918 | A1* | 9/2012 | Kaida ................ G09B 7/00 434/362 |
| 2013/0044130 | A1 | 2/2013 | Geisner et al. |
| 2013/0054435 | A1 | 2/2013 | Zhang et al. |
| 2013/0086077 | A1 | 4/2013 | Piippo et al. |
| 2013/0173461 | A1 | 7/2013 | Levy |
| 2013/0293580 | A1 | 11/2013 | Spivack |
| 2013/0314421 | A1 | 11/2013 | Kim |
| 2013/0335573 | A1 | 12/2013 | Forutanpour et al. |
| 2014/0071163 | A1 | 3/2014 | Kinnebrew et al. |
| 2014/0129354 | A1 | 5/2014 | Soon-Shiong |
| 2014/0139551 | A1 | 5/2014 | McCulloch et al. |
| 2014/0214670 | A1 | 7/2014 | Mckenna |
| 2014/0225922 | A1 | 8/2014 | Sbardella |
| 2014/0278786 | A1 | 9/2014 | Liu-Qiu-Yan |
| 2014/0298260 | A1* | 10/2014 | Abowd ............... G06F 3/04842 715/810 |
| 2014/0306994 | A1 | 10/2014 | Brown et al. |
| 2014/0330618 | A1* | 11/2014 | Wong ................ G06Q 30/0203 705/7.32 |
| 2014/0362111 | A1 | 12/2014 | Kim |
| 2014/0375683 | A1 | 12/2014 | Salter et al. |
| 2015/0012426 | A1 | 1/2015 | Purves et al. |
| 2015/0035861 | A1 | 2/2015 | Salter et al. |
| 2015/0046296 | A1 | 2/2015 | Hart |
| 2015/0242865 | A1 | 8/2015 | Richards |
| 2015/0339453 | A1 | 11/2015 | Richards et al. |
| 2016/0055674 | A1 | 2/2016 | Mullins et al. |
| 2016/0217620 | A1 | 7/2016 | Constantinides |
| 2016/0277424 | A1 | 9/2016 | Mawji et al. |
| 2016/0299563 | A1 | 10/2016 | Stafford et al. |
| 2016/0313877 | A1 | 10/2016 | Ha et al. |
| 2016/0370954 | A1 | 12/2016 | Burningham et al. |
| 2017/0039613 | A1 | 2/2017 | Kaehler et al. |
| 2017/0039988 | A1 | 2/2017 | Whiting et al. |
| 2017/0180980 | A1* | 6/2017 | Courtright ............. H04W 8/22 |
| 2017/0293958 | A1 | 10/2017 | Tang |
| 2017/0323481 | A1 | 11/2017 | Tran et al. |
| 2017/0365101 | A1 | 12/2017 | Samec et al. |
| 2018/0004283 | A1 | 1/2018 | Mathey-Owens et al. |
| 2018/0060883 | A1 | 3/2018 | Cheesman et al. |
| 2019/0139318 | A1 | 5/2019 | Tierney et al. |

OTHER PUBLICATIONS

U.S. Appl. No. 14/743,745, filed Nov. 2, 2017, Office Action.
U.S. Appl. No. 14/743,745, filed May 14, 2018, Office Action.
U.S. Appl. No. 14/816,983, filed Jan. 19, 2018, Office Action.
U.S. Appl. No. 14/816,983, filed Jul. 27, 2018, Office Action.
U.S. Appl. No. 14/816,983, filed Dec. 13, 2018, Notice of Allowance.
U.S. Appl. No. 15/226,699, filed Feb. 23, 2018, Office Action.
U.S. Appl. No. 15/226,699, filed Sep. 19, 2018, Notice of Allowance.
U.S. Appl. No. 15/254,750, filed Dec. 26, 2018, Office Action.
U.S. Appl. No. 16/241,728, filed Feb. 25, 2019, Office Action.
U.S. Appl. No. 14/743,745, filed Sep. 18, 2019, Notice of Allowance.
U.S. Appl. No. 15/254,750, filed Aug. 8, 2019, Office Action.
U.S. Appl. No. 16/241,728, filed Oct. 28, 2019, Office Action.
U.S. Appl. No. 15/254,750, filed Apr. 9, 2020, Office Action.
U.S. Appl. No. 16/241,728, filed Feb. 6, 2020, Office Action.
U.S. Appl. No. 16/241,728 dated Sep. 9, 2020, Office Action.

* cited by examiner

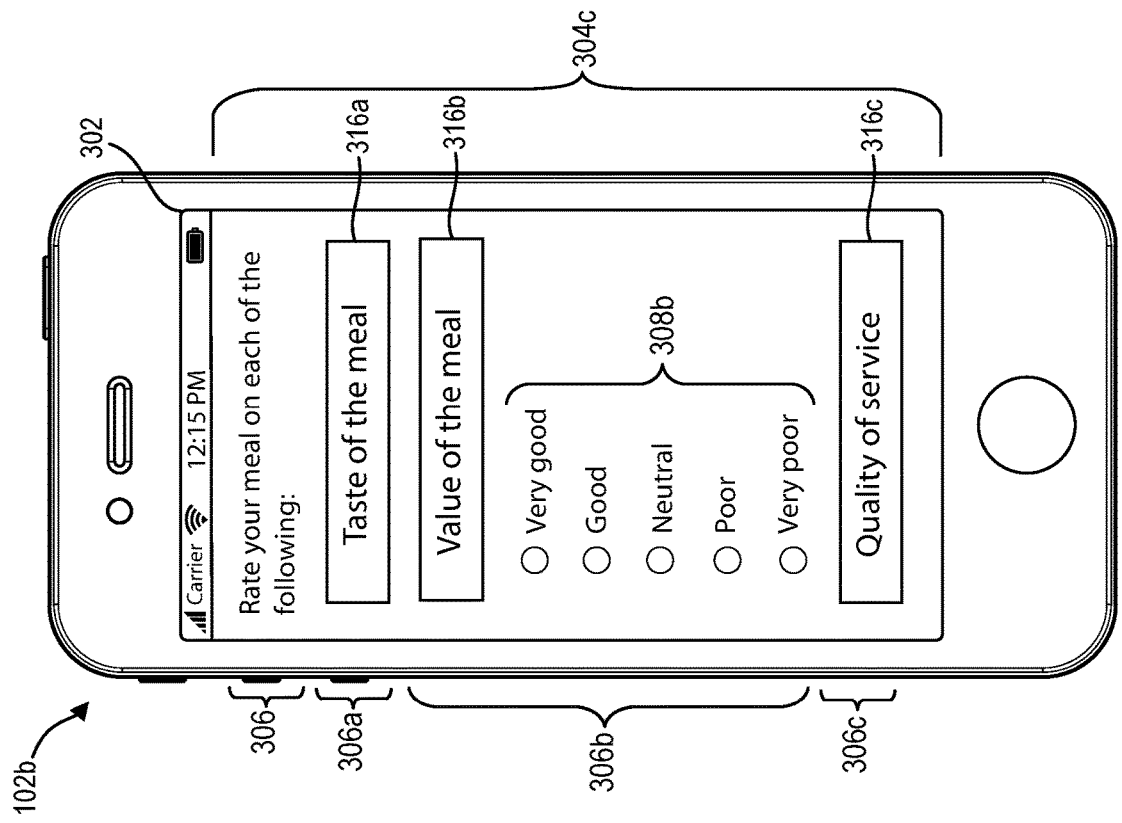
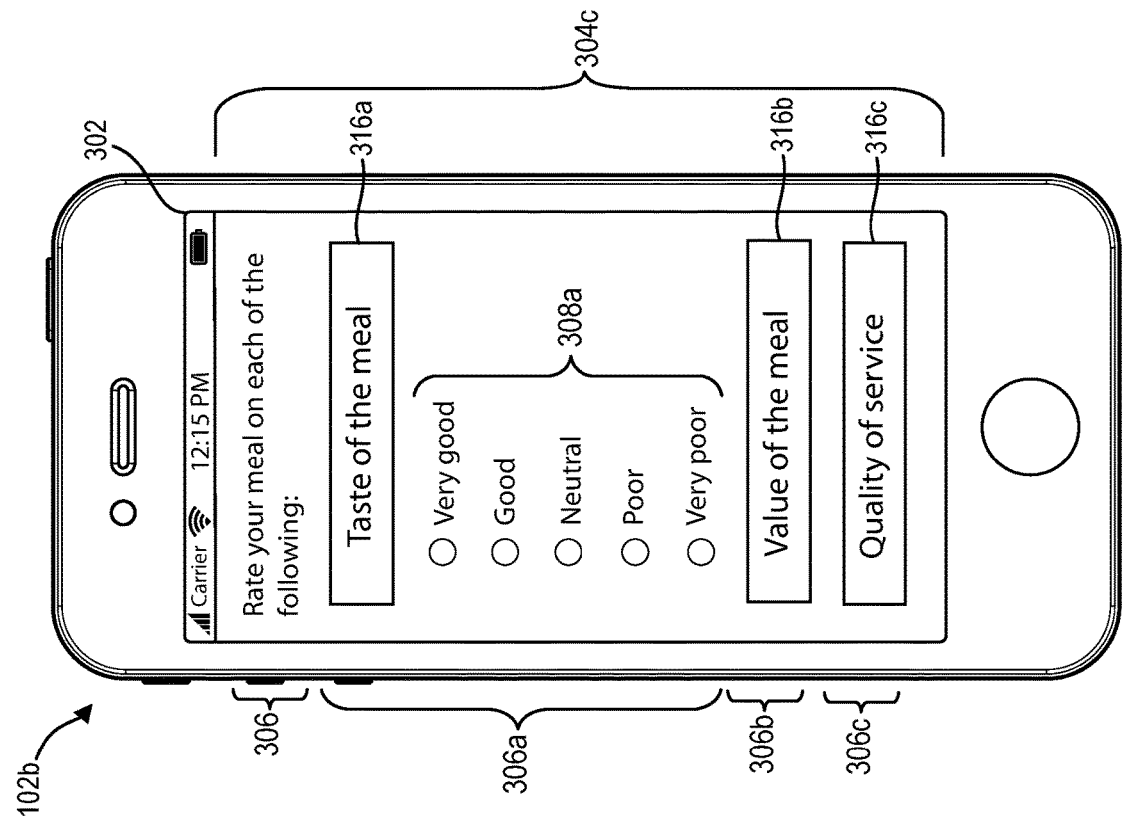
Fig. 3C
Fig. 3D

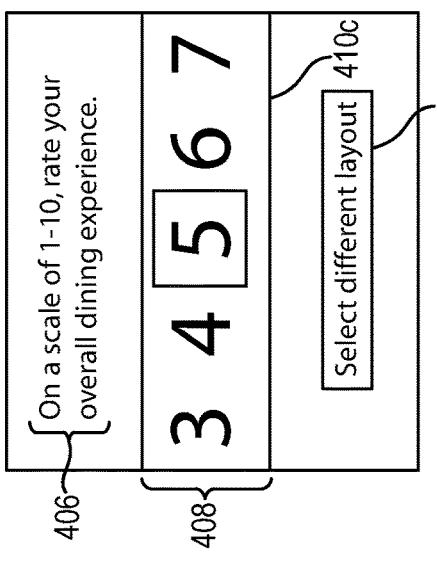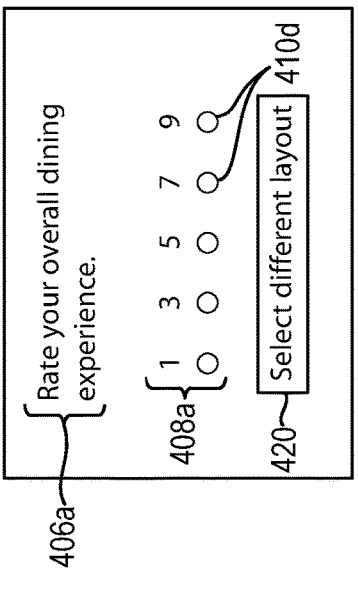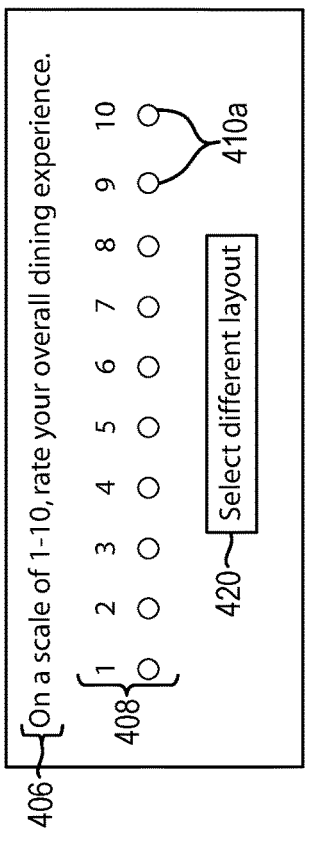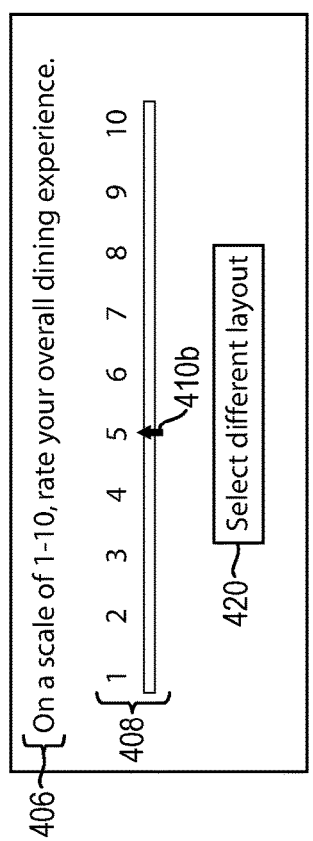
Fig. 4C
Fig. 4D
Fig. 4A
Fig. 4B

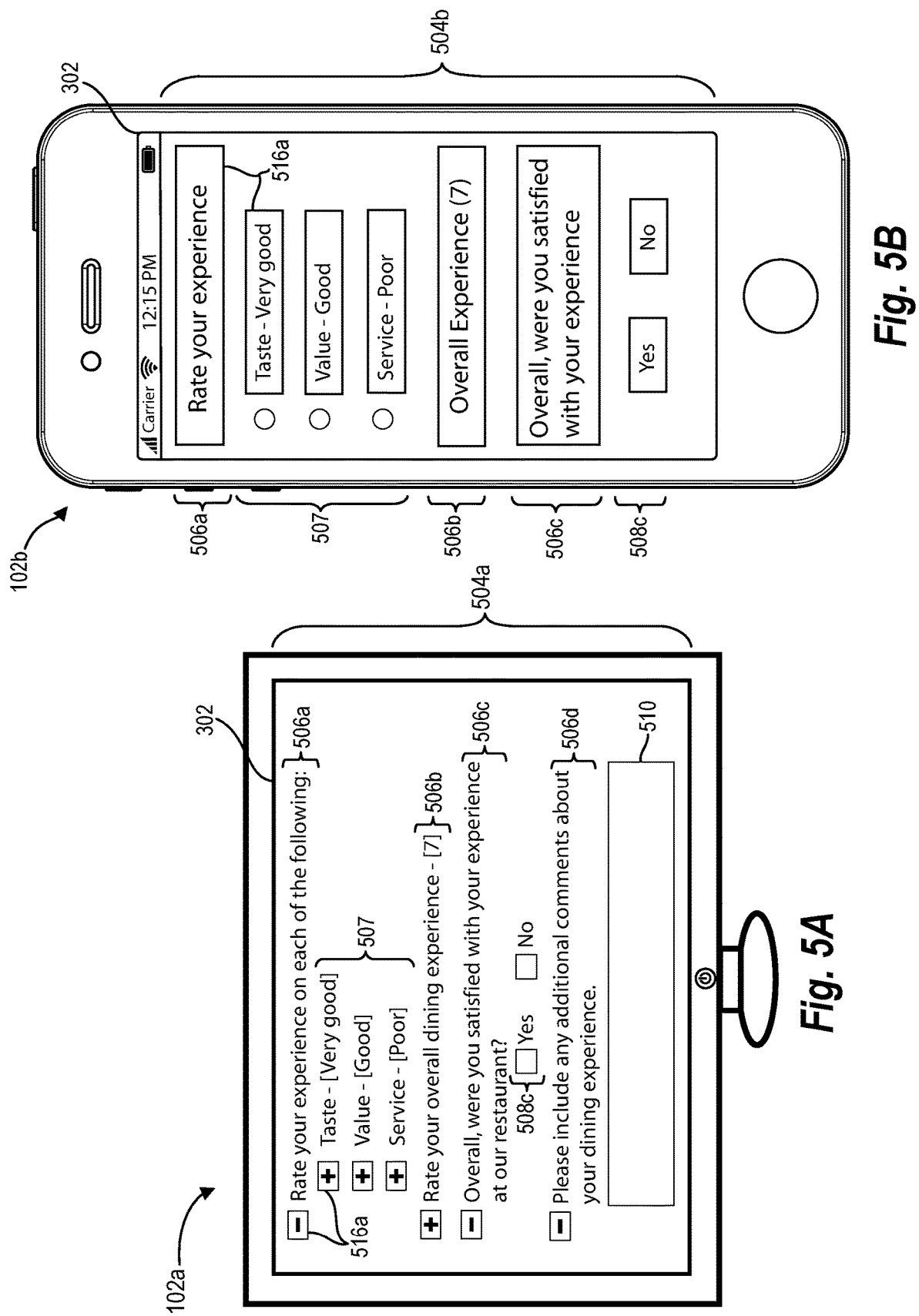

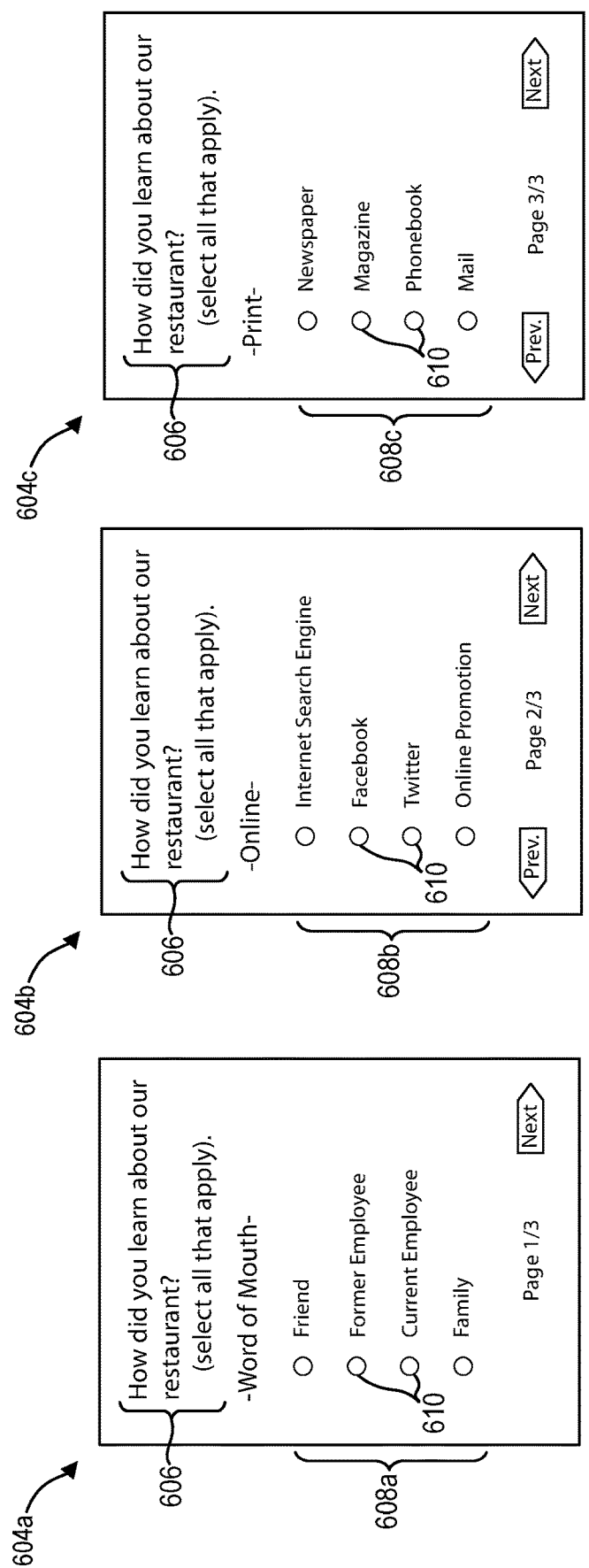

PROVIDING A DISPLAY BASED ELECTRONIC SURVEY

CROSS REFERENCE TO RELATED APPLICATIONS

This application is a continuation of U.S. patent application Ser. No. 14/816,983, filed Aug. 3, 2015. The aforementioned application is hereby incorporated by reference in its entirety.

BACKGROUND

1. Technical Field

One or more embodiments of the present disclosure relate generally to systems and methods for presenting electronic survey questions. More specifically, one or more disclosed embodiments relate to systems and methods for providing electronic survey questions in accordance with a display area on a client device.

2. Background and Relevant Art

Companies often rely on opinions and feedback from past customers to improve the experience of current and future customers. A common method of acquiring feedback is through customer surveys, including customer ratings and reviews (e.g., ratings and reviews for products, services, businesses, etc.). For example, a company may use feedback obtained from a survey administered to one or more past customers to improve future customer experience with the company.

Due to the development of electronic communication technologies, many surveys are administered to survey respondents via the Internet as electronic surveys. Additionally, as the number of different types of computing devices having Internet capabilities has increased, more and more electronic surveys are administered on computing devices that have various different features (e.g., monitor/screen sizes, input devices (touchscreen vs. mouse)). While the increased availability of computing devices has facilitated an increase in the use of electronic surveys, there currently exist a number of problems in administering electronic surveys on a variety of different computing devices.

As an initial problem, while computing devices have increased the convenience of administering electronic surveys, the presentation of an electronic survey designed for a computing device having a large display area often fails to translate effectively to a mobile device having a more limited display area. For example, where a multiple choice survey question fits on a monitor of a desktop computer, the same multiple choice survey question may fail to fit on a display screen of a mobile device. Often, in an attempt to fit the survey on a display screen of a mobile device, a user dramatically decreases the size of the text, but then, the readability of the survey question is also reduced for the user. As such, mobile devices and other electronic devices having a limited display area often fail to provide a user-friendly presentation of an electronic survey.

In addition to inadequacies in presenting the electronic survey on mobile devices (and other electronic devices having limited display areas), conventional electronic surveys often fail to account for differences in how a user interacts with a respective device. For example, where a desktop computer may include a keyboard, mouse, and/or other input device for interacting with an electronic survey, a mobile device may include a touch screen and/or keypad for interacting with the same electronic survey. As such, many electronic surveys are well-suited for administration with a particular type of input device, but ill-suited for administration using a different type of input device.

To account for administration of electronic surveys on different devices, many conventional systems administer different surveys for different respective devices. Nevertheless, administering different electronic surveys for different devices can become a burdensome process as individual surveys are created for different operating systems, different devices, and/or different applications. Furthermore, as the variety of mobile devices and other electronic devices continues to increase, creating different surveys to be administered for each different type of device can become time-consuming, expensive, and generally impractical.

Accordingly, these and other disadvantages exist with respect to conventional systems and methods for providing an electronic survey.

SUMMARY

Embodiments of the present disclosure provide benefits and/or solve one or more of the foregoing or other problems in the art with systems and methods for providing an electronic survey to a user. For example, the systems and methods disclosed herein enable presenting an electronic survey to a user in accordance with a survey layout that corresponds to a display area of a client device. Further, the systems and methods enable presentation of the same electronic survey across different client devices having different interactive features and different display areas.

To illustrate, example embodiments of the systems and methods described herein may enable a client device to present an electronic survey to a user in a user-friendly presentation. In particular, one or more embodiments include associating a plurality of question layouts with one or more survey questions and providing the survey question(s) to a client device. Additionally, in one or more embodiments, providing a survey question to the client device causes the client device to determine a question layout (from the plurality of question layouts) based on one or more client device characteristics. For example, the client device can determine a question layout to display from the plurality of question layouts based on a display area of a graphical user interface on the client device, and provide the survey question for display to the user in accordance with the determined question layout. As such, the systems and methods can present an electronic survey to a user in a layout that is well suited for a display area available to the user.

Additionally, one or more embodiments provide an electronic survey to a user in a layout that enables the user to conveniently interact with the electronic survey on a particular client device. For example, the systems and methods may include determining a question layout based on one or more input capabilities of the client device. For example, where a client device includes a touch screen, the systems and methods may cause the client device to select a layout well suited to receive user input via the touch screen input device. As such, the systems and methods can provide a user experience that allows the user to conveniently interact with the electronic survey on a particular client device.

Furthermore, in one or more embodiments, the systems and methods may enable one or more of the above advantages without the need for a survey administrator to create multiple different versions of an electronic survey. For example, rather than providing a different electronic survey for different devices, a client device may receive an electronic survey that includes a plurality of associated layouts and provide the electronic survey to a user in accordance with a determined layout from the plurality of layouts. As such, the systems and methods allow a survey administrator to create a single electronic survey, and then administer the single electronic survey to users across different client devices having different characteristics.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which:

FIGS. 3A-3E illustrate example display areas showing at least a portion of an electronic survey in accordance with one or more embodiments;

FIGS. 4A-4D illustrate example display areas showing at least a portion of an electronic survey in accordance with one or more embodiments;

FIGS. 5A-5B illustrate example display areas showing at least a portion of an electronic survey in accordance with one or more embodiments;

FIGS. 6A-6D illustrate example display areas showing at least a portion of an electronic survey in accordance with one or more embodiments;

DETAILED DESCRIPTION

Figure 1:
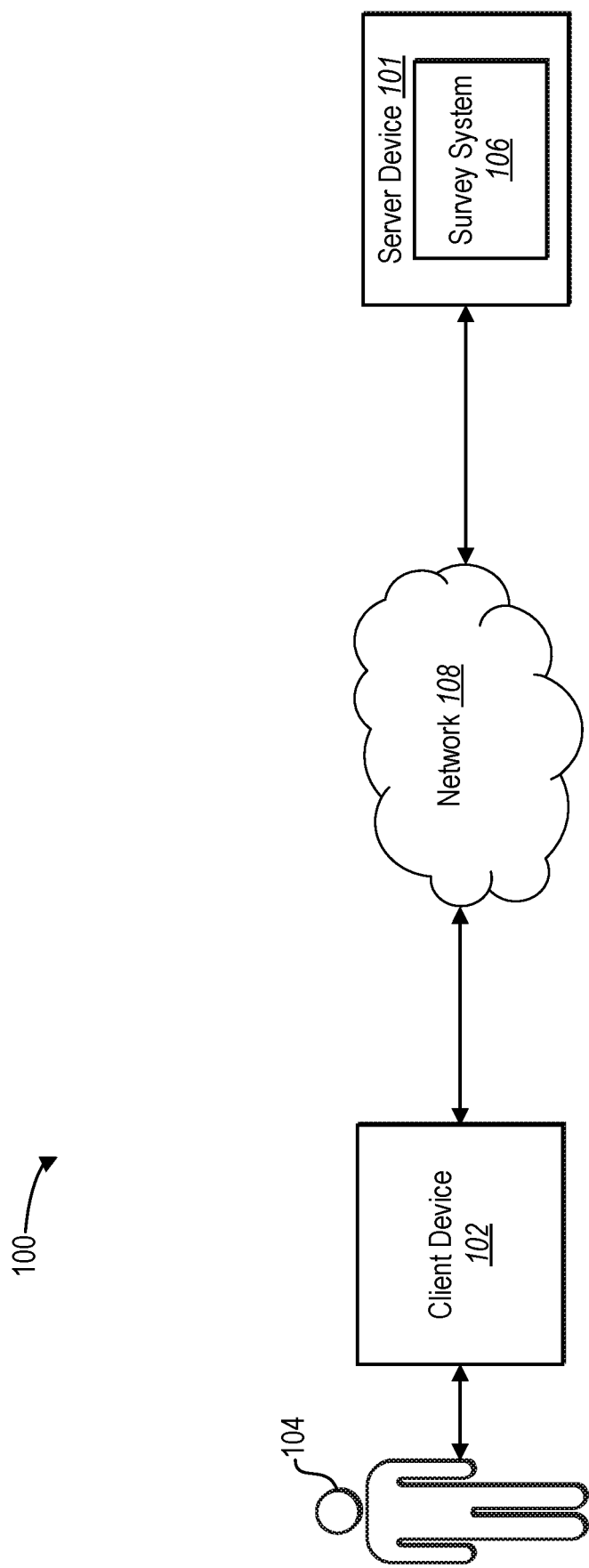
FIG. 1 illustrates a block diagram of a communications system in accordance with one or more embodiments.

The embodiments disclosed herein provide a communication system (or simply a "system") that provides an electronic survey that is customized for a particular client device. In particular, the system facilitates providing an electronic survey to a user in accordance with one or more characteristics of a client device. For example, in one or more embodiments, a survey system can associate a plurality of layouts with one or more survey questions within an electronic survey. Furthermore, the survey system can provide a survey question associated with a plurality of layouts to a client device for presentation to a user. In addition to providing the survey question, the survey system can provide instructions that cause the client device to identify one or more characteristics of the client device as well as determine which of the plurality of layouts associated with the survey question to use based on the one or more characteristics of the client device. Further, the client device can provide the survey question to a user for display in accordance with the determined layout.

Additionally, one or more embodiments of the system can enable a client device to present an electronic survey to a user in a user-friendly layout in accordance with one or more features of a display area. For example, a client device may receive a survey question, associated layouts, and instructions for determining which of the associated layouts to use to display the question within a display area on the client device. Upon receiving the survey question, the associated layouts, and the instructions, the client device may identify one or more features of a display area within a graphical user interface and determine a layout from the associated layouts based on the identified feature(s) of the display area. The client device can further provide the survey question in accordance with the determined layout. As such, the system can cause the client device to present one or more survey questions using a layout that is well suited for a particular display area within a graphical user interface particular to a specific client device.

Further, in one or more embodiments, the system enables a user to conveniently interact with an electronic survey using one or more input elements in accordance with the one or more features of the display area. For example, as mentioned above, the client device may receive a survey question, associated layouts, and instructions that indicate how to select a layout to use to display the survey question on the client device. Additionally, in one or more embodiments, the associated layouts include one or more input elements related to how a user can interact with the survey question (e.g., provide a response to the survey question). As such, where a client device includes a touch screen, for example, the client device may present the survey question in accordance with a layout that is well suited for a user to interact with the survey question using the touch screen. Alternatively, where a client device is a desktop that does not include a touch screen, the client device may present the survey question in accordance with a layout that is better suited for a user to interact with the survey question using a mouse and keyboard, for example. As such, the client device may enable the user to interact with a survey question using an input element that is best suited for a particular client device.

In addition, and as mentioned above, the system enables a variety of client devices having different display features to present a survey question to a user using a layout customized based on specific characteristics corresponding the each of the various client devices. In particular, and as mentioned above, a survey system may associate any number of layouts with a survey question and enable any client device to determine one of the layouts best suited for the client device. Further, any client device may provide the survey in accordance with a layout that is determined based on one or more features/characteristics particular to the client device. In this way, a survey system can administer a single electronic survey to various types of client devices without the need for a survey administrator to compose a separate electronic survey for each type of client device.

To illustrate, in one or more embodiments the system can provide a process in which a single survey question is administered to multiple different types of client devices using different layouts. For example, a client device may receive a survey question having a first associated layout and a second associated layout. In this example, a mobile device may receive the survey question and determine that the first associated layout is well suited for presentation on a client device having dimensions and/or input capabilities similar to that of the mobile device. As such, the mobile device may select the first layout and present the survey question to a user using the first layout. Alternatively, a desktop computer may receive the survey question and determine that the second associated layout is well suited for presentation on a client device having dimensions and/or input capabilities similar to that of the desktop computer. As such, the desktop computer may select the second layout and present the same survey question to the user using the second layout.

Additionally, the system may provide greater flexibility in presenting survey questions by enabling presentation of a survey question using different layouts based on changing features of a display area on a client device. For example, in one or more embodiments, the client device can provide a survey question to a user via a browser window having a display area that is capable of changing size. Where one layout is well suited for a larger browser window, the same layout may be ill suited for a smaller browser window. As such, by associating different layouts with a survey question, the client device may determine and implement a different layout based on the size of the display area changing for the browser window, thus providing the user with a survey question in an optimal format regardless of the various possible display area dimensions.

In realizing one or more features described herein, one or more embodiments of the system implement a survey question and associated layouts within a hyper text markup language (HTML) presentation that includes one or more cascading style sheet (CSS) classes. Each CSS class may include one or more different layouts and/or input elements that correspond to a set or range of features of a display area. In this way, an author of an electronic survey may include any number of layouts associated with different features of a display area and/or any characteristics of a client device to enable a client device to provide the survey question to a user in a customized and user-friendly layout.

As used herein, the term "survey" or "electronic survey" refers to a tool used to collect quantitative information about items. For example, a survey may include a poll, questionnaire, census, or other type of sampling. In some example embodiments, the term survey may also refer to a method of collecting information from respondents. As used herein, the term "respondent" refers to a person who participates in, and responds to, a survey. Alternatively, a user of a client device may refer to a respondent.

An electronic survey may include one or more survey questions. As used herein, the term "survey question" refers to content and/or prompts included in the electronic survey that invoke a response from a respondent. Types of questions can include, but are not limited to, multiple choice, open-ended, ranking, scoring, summation, demographic, dichotomous, differential, cumulative, dropdown, matrix, net promoter score (NPS), single textbox, heat map, etc. In one or more embodiments, when one or more answer choices are available for a survey question, the term survey question may include a question along with available answer choices corresponding to the survey question. Further, content of a survey question (or simply "survey content") may include both the question itself as well as one or more answers associated with the survey question. Additionally, survey content may refer to any content provided in conjunction with the survey question within a graphical user interface of a client device. For example, survey content may refer to survey questions and corresponding answers or answer options.

As used herein, a "display area" refers to an area within a graphical user interface capable of displaying survey content including survey questions and corresponding answer options. For example, a display area may refer to an area in which one or more survey questions are provided to a user via a client device. In one or more embodiments, a display area refers to the entire display area (e.g., monitor/screen size) of a client device. Alternatively, the display area may refer to a portion of a graphical user interface that includes one or more survey questions.

Additionally, the display area may include various features (e.g., display features) that characterize a display area within a graphical user interface. Examples of display features include, but are not limited to, size, dimensions, layout, orientation, resolution, input capabilities, display settings, user preferences, and other characteristics of a graphical user interface or client device that affect a display within a graphical user interface. Further, one or more display features may correspond to a particular value (e.g., feature value) or range of values descriptive of a display area. For example, a feature value may include a particular value descriptive of a length, width, resolution, ratio, or other value descriptive of a display area.

Furthermore, as used herein, a "layout" refers to a format in which survey content is presented to a user on a client device. In particular, a layout can refer to instructions that cause a client device to provide survey content in accordance with a particular format. For example, a layout can provide instructions for providing how survey content is visually presented, organized, or otherwise provided to a user via a display area. Additionally, a layout can include various graphical elements to enable a user to respond or otherwise interact with the survey content as presented via a client device. Further, a layout may refer to a format in which an entire electronic survey, a portion of the electronic survey, and/or a single survey question is presented to the user. For example, a "question layout" may refer to a format that a survey question or a portion of the survey question is displayed within a display area. Additionally, a "survey layout" may refer to a format that an electronic survey or a portion of the electronic survey is displayed within the display area. Various examples of layouts will be described in greater detail below.

Additional features and characteristics of one or more embodiments of the system are described below with respect to the figures. For example, FIG. 1 illustrates a block diagram of an example embodiment of a communication system 100 (or simply "system 100"). In general, and as illustrated in FIG. 1, the system 100 can include a client device 102 that is associated with a user 104. The client device 102 can communicate with a server device 101 over a network 108. Further, the server device 101 can include a survey system 106. As will be described in greater detail below, the client device 102 can perform or provide the various functions, features, processes, methods and systems as described herein. Additionally or alternatively, the server device 101 can perform or provide the various functions, features, processes, methods and systems as described herein. In one or more embodiments, the client device 102 and server device 101 coordinate together to perform or provide the various functions, features, processes, methods and systems, as described in more detail below. Alternatively, in one or more embodiments, the client device 102 can perform or provide the various functions, features, processes, methods and systems without communicating with the server device 101.

Generally, the client device 102 can include any one of various types of client devices. For example, client device 102 can be a mobile device (e.g., smart phone), tablet, laptop computer, desktop computer, or any other type of computing device as further explained below with reference to FIG. 8. Additionally, the server device 101 may include one or multiple computing devices including those explained below with reference to FIG. 8. The client device 102, server device 101, and network 108 may communicate using any communication platforms and technologies suitable for transporting data and/or communication signals, including any known communication technologies, devices, media, and protocols supportive of remote data communications, examples of which are also described with reference to FIG. 9.

As an initial overview of one or more embodiments of the system 100, the server device 101 may enable a survey author of an electronic survey to generate an electronic survey including any number of survey questions. In particular, the server device 101 may include a survey system 106 that enables a survey author to interact with the server device 101 to compose, select, or otherwise generate an electronic survey to administer to one or more respondents. For example, an author can communicate with the server device 101 using a device similar to the client device 102. Alternatively, the author may interact directly with the server device 101 or other similar computing device to generate an electronic survey.

In addition to generating the electronic survey, the server device 101 may facilitate associating one or more layouts with the electronic survey. For example, the survey system 106 may assign, link, or otherwise associate one or more question layouts with survey questions that make up an electronic survey. Additionally, in one or more embodiments, the survey system 106 can associate a layout with a survey question by assigning, linking, or otherwise associating a layout with a particular display feature or range of feature values.

Upon generating an electronic survey and associating any number of layouts with the electronic survey, the server device 101 may enable a client device 102 to access the electronic survey. For example, the server device 101 may transmit, share, or otherwise provide the electronic survey to the client device 102 over the network 108. In one or more embodiments, the server device 101 provides the electronic survey to the client device 102 using a plug-in or application installed on the client device 102. Alternatively, in one or more embodiments, the server device 101 provides the electronic survey to the client device 102 via a web page using a web browser installed on the client device 102.

In addition to providing the electronic survey to the client device 102, the server device 101 may further provide any number of associated layouts to the client device 102. For example, the server device 101 may include each of the associated layouts within a survey presentation that includes the electronic survey. Alternatively, in one or more embodiments, the server device 101 provides the associated layouts in a separate communication from a communication containing the electronic survey. For example, the server device 101 can provide a first communication that includes instructions to determine which of the associated layouts to use with a particular client device, and then, based upon the layout determination, the server device 101 can send a second communication that includes survey data (e.g., a survey question) within the determined layout.

Upon receiving the electronic survey, the client device 102 may enable a user 104 to respond to the electronic survey by providing the electronic survey to the user 104 via a graphical user interface on the client device 102. For example, the user 104 may interact with the electronic survey on the client device 102 and respond to the survey questions. As the user 104 responds to survey questions in the electronic survey or upon completion of the electronic survey, the client device 102 can provide the answers and other relevant data to the server device 101 to be stored and later accessed by the author or other entity associated with administration of the electronic survey.

In addition to receiving and generally administering the electronic survey to the user 104, the client device 102 may provide survey questions to the user 104 in accordance to one or more of the associated layouts. In particular, as mentioned above, the server device 101 may provide any number of layouts associated with the electronic survey to the client device 102. Further, the client device 102 may identify a feature of a display area within a graphical user interface. Based on the identified feature, the client device 102 can identify, select, or otherwise determine a layout for one or more questions of the electronic survey. For example, upon identifying a display feature and determining a layout that corresponds to the identified display feature, the client device 102 can provide a survey question of the electronic survey to the user 104 within the display area using the identified layout.

Figure 2:
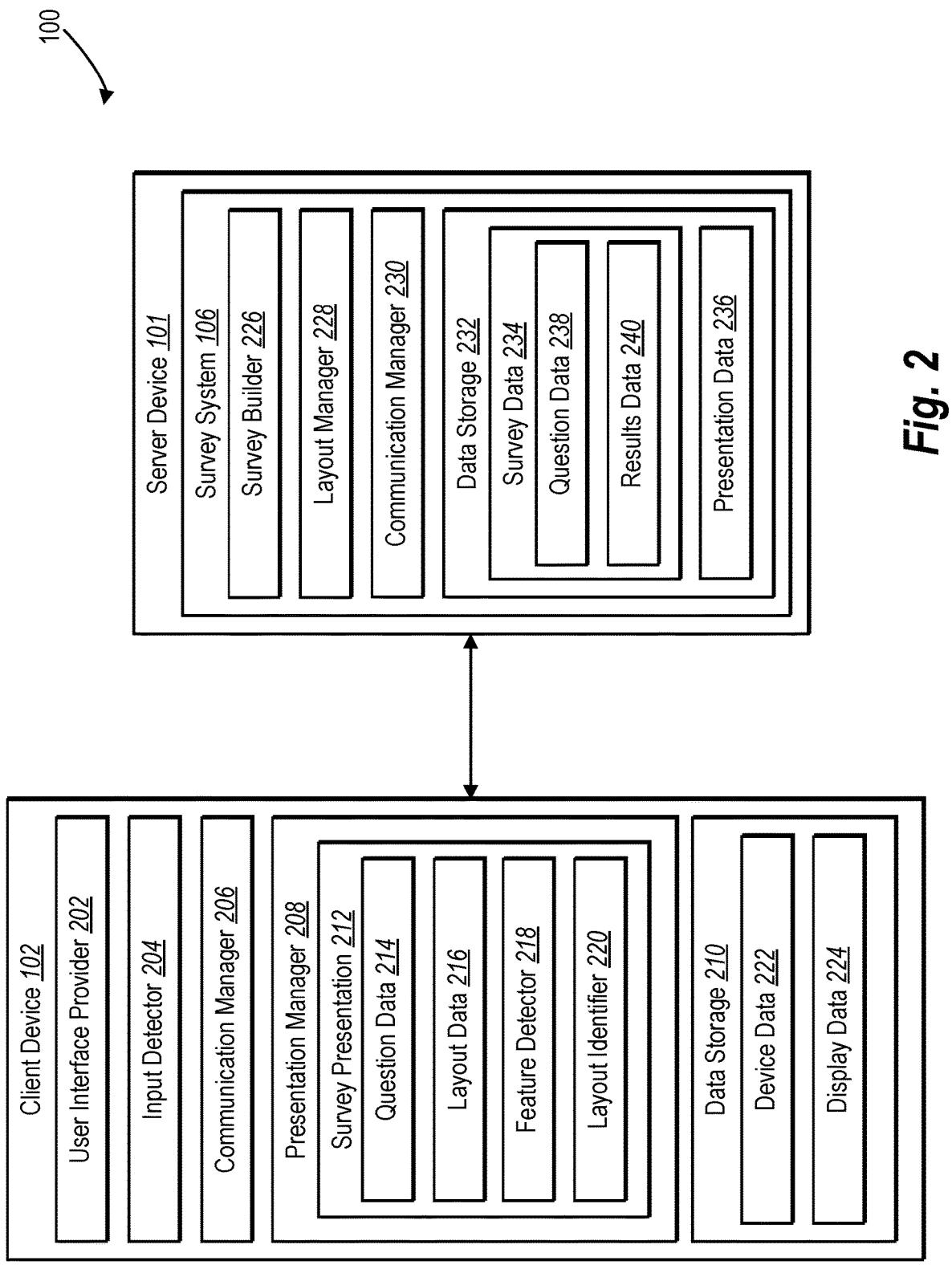
FIG. 2 illustrates a schematic diagram of a survey system upon which at least a portion of a communications system is implemented in accordance with one or more embodiments.

FIG. 2 illustrates an example embodiment of a client device 102 and server device 101 including a survey system 106 that may operate within the communication system 100 described with respect to FIG. 1. As shown, the client device 102 can include, but is not limited to a user interface provider 202, an input detector 204, and a communication manager 206. In addition, the client device 102 can include a presentation manager 208 that can provide a survey presentation 212, which includes question data 214, layout data 216, a feature detector 218, and a layout identifier 220. Further, the client device 102 can include a data storage 210 that includes device data 222 and display data 224.

Each of components 202-224 of client device 102 may be in communication with one another using any suitable communication technologies. In addition, although components 202-224 are shown separately in FIG. 2, any of components 202-224 may be combined into fewer components, such as into a single component, or divided into more components as may serve a particular embodiment. In addition, components 202-224 may be located on, or implemented by, one or more computing devices, such as one or more client devices and/or one or more server devices (e.g., server device 101).

As further shown in FIG. 2, survey system 106 can include, but is not limited to, a survey builder 226, a layout manager 228, and a communication manager 230. The survey system 106 can further include a data storage 232 that includes survey data 234 and presentation data 236. Additionally, as illustrated in FIG. 2, the survey data 234 can include question data 238 and result data 240. It will be recognized that although components 226-240 are shown separately in FIG. 2, any of components 226-240 may be combined into fewer components, such as into a single component, or divided into more components as may serve a particular embodiment. Components 226-240 may be located on, or implemented by, one or more computing devices, such as one or more server devices. Additionally, it will be recognized that although FIG. 2 shows that components 226-240 are located on the server device 101, some or all of the components 226-240 may be located on the client device 102. Further, in the case that there is no connection between the client device 102 and the server device 101, (e.g., the client device 102 and/or the server device 101 are offline) the client device 102 can perform one or more of the features and functionality described in connection with components 226-240 in addition to other features and functionality described in connection with the client device 102.

Each of components 202-240 can comprise software, hardware, or both. For example, each of components 202-240 can comprise one or more instructions stored on a computer-readable storage medium and one or more processors of one or more computing devices to execute instructions. When executed by the one or more processors, the computer-executable instructions cause a computing device to perform the methods described herein. Alternatively, components 202-240 can comprise hardware, such as a special purpose processing device to perform a certain function or group of functions.

As mentioned above, the survey system 106 can include a survey builder 226 that facilitates composing or otherwise generating an electronic survey. In particular, the survey builder 226 may enable an author or other entity to compose survey content, such as one or more survey questions and answer options. Moreover, the survey builder can compile the composed survey content into an electronic survey for administration to respondents. For example, the survey builder 226 can provide an interface via the server device 101 and/or other computing device with which a survey author interacts to generate survey content (e.g., questions, answer options) for administration of an electronic survey to a respondent.

In generating the survey content, the survey builder 226 may enable an author to generate the survey content in various ways. For example, the survey builder 226 may provide an interface that enables the author of the electronic survey to compose each question and/or answer option as well as compose any additional content to include as part of the electronic survey. Additionally, in one or more embodiments, the survey builder 226 can provide a library of survey questions and answer options from which an author may select questions and answer options to include within the electronic survey. For example, a library of survey questions may include any number of survey questions and corresponding answer options that are commonly or frequently used within electronic surveys. Additionally, the library of survey questions may include any survey question and answer options that one or more users of the survey system 106 have added to the library.

The survey system 106 can also include a layout manger 228 that generates one or more layouts used in presenting one or more survey questions of an electronic survey to a user 104. In particular, the layout manager 228 can create any number of layouts that determine how survey content is presented to the user 104. For example, a layout may indicate that a survey question is displayed at the top of a display area with each answer option displayed in a single horizontal row beneath the survey question. In another example, a layout may indicate that a survey question is displayed on a left side of a display area with each answer option displayed on a right side of the display area. As another example, a layout may indicate that the survey question is displayed without showing the answer options and, in response to a user input, expanding the survey question content to include the answer options within the display area. It is appreciated that any number of layouts may be used in presenting an electronic survey and corresponding survey content.

Additionally, a layout may include one or more input elements that indicate how a user 104 interacts with the electronic survey. In particular, a layout may include one or more input elements presented to the user 104 with which the user 104 interacts when responding to an electronic survey. For example, in one or more embodiments, a layout includes a graphical element for each answer option that a user 104 may select to identify a selection of the answer option(s). Examples of graphical elements include, but are not limited to, answer bubbles, selection boxes, scroll bars, slider icons, or other graphical elements with which a user may interact when indicating an answer to a survey question.

Additionally, one or more input elements may include graphical elements that enable a user to navigate through the electronic survey and interact with the survey questions in ways other than answering the survey questions. For example, a layout may include graphical elements that enable a user to skip survey questions and/or expand or collapse survey questions. Furthermore, a layout can include graphical elements that allow a user to interact with answer options within a display area, view previously answered questions, or otherwise navigate through and experience an electronic survey.

The layout manager 228 can associate any number of layouts with an electronic survey. For example, the layout manager 228 can generate an electronic survey that includes survey content and any number of layouts that define how the survey content is provided to a user 104 via a client device 102. In one or more embodiments, the electronic survey can include an HTML presentation including survey content and associated layouts. Additionally, in one or more embodiments, the associated layouts include one or more CSS classes that define the associated layouts and include instructions for how the survey content is presented to the user 104 for a particular client device 102.

In addition to generally including survey content and associated layouts, the survey presentation (e.g., HTML presentation) may further include instructions on when to use each of the respective layouts (e.g., CSS classes) when presenting the survey content to the user 104. In particular, the layout manager 228 may include instructions that identify one or more features that determine whether a particular layout should be used when presenting survey content via a client device 102. For example, the layout manager 228 may assign, tag, or otherwise associate a layout with a specific display feature, combination of display features, and/or client device characteristics that the client device 102 can identify to determine which layout to use when presenting the electronic survey to the user 104.

As an alternative to considering a single display feature or a combination of display features, the layout manager 228 may consider a hierarchy of display features when determining and associating an appropriate layout for a display area. In particular, because display areas can include any number of display features, the layout manager 228 may identify features having higher priority when identifying a corresponding layout to one or more features. For example, where a display area has a total display space corresponding to a first layout, but has substantially larger horizontal dimensions than vertical dimensions that correspond to a second layout, the layout manager 228 may assign the horizontal orientation as having a higher priority than the total display space by weighting the horizontal orientation higher than a total display space. Additionally, the layout manager 228 may assign any order or hierarchy to the features or combinations of features.

To illustrate, in one or more embodiments, the layout manager 228 associates one or more layouts with display features corresponding to respective types of client devices 104. For example, the layout manager 228 may associate a first layout with a survey question that causes the client device 102 to use the first layout if the client device 102 is a mobile device. Additionally, the layout manager 228 may associate a second layout with the survey question that causes the client device 102 to use the second layout if the client device 102 is a desktop computer. In a further example, rather than associating a layout with a generic type of client device, (e.g., smart phone, tablet, desktop computer) the layout manager 228 may associate layouts with a library of models of common or popular client devices.

Additionally, in one or more embodiments, the layout manager 228 can associate one or more layouts with display features associated with a graphical user interface of the client device 104. In particular, rather than associating a separate layout for each type or model of client device 104, the layout manager 228 may associate one or more layouts with display specifications of client devices. For example, the layout manager 228 may associate a first layout with a five inch screen, a second layout with a ten inch screen, and a third layout with a twenty inch screen. In one or more embodiments, the layout manager 228 associates layouts with ranges of display specifications (e.g., dimensions, resolution). For example, the layout manager 228 may associate a first layout for screens under eight inches, a second layout for screens between eight and sixteen inches, and a third layout for screens over sixteen inches.

Additionally, in one or more embodiments, the layout manager 228 may associate one or more layouts with one or more capabilities of the client device 104. In particular, the layout manager 228 may associate different layouts for different display and/or input capabilities of a client device 104. As an example, the layout manager 228 can associate a first layout for a client device 104 having a touch screen interface. The layout manager 228 can further associate a second layout for a client device 102 having a keyboard and/or mouse interface. Additionally, the layout manager 228 can associate a third layout with a client device having both a touch screen and keyboard interface.

In addition, or as an alternative to associating the layouts with specifications and capabilities that are associated with the hardware of the client device 102, the layout manager 228 can associate one or more layouts with a display area within which survey content is provided to a user 104 on the client device 102. In particular, where an electronic survey is administered within a window of an Internet browser or other application, the layout manager 228 may associate layouts with particular sizes of the display area corresponding to the window of the Internet browser or application.

Similar to associating a layout with a particular screen size or size of a graphical user interface, the layout manager 228 may associate layouts with respective sizes of display areas within a graphical user interface of a client device 104. For example, the layout manager 228 may associate a first layout with any display area having a display size (e.g., diagonal dimension of the display area) of ten inches or less.

Further, the layout manager 228 may associate a second layout with any display area having a display size of more than ten inches. Additionally, similar to embodiments described above in connection with the size of a display device or graphical user interface, the layout manager 228 may associate one or more layouts with various ranges of display area dimensions.

In addition to associating various layouts with physical screen sizes and physical dimensions of a display area, the layout manager 228 may further consider the logical image size of a graphical user interface or display area within the graphical user interface in associating one or more layouts with display areas. For example, rather than associating layouts with physical dimensions of a display area, the layout manager 228 may associate one or more layouts with display resolutions or pixel dimensions. For instance, the layout manager 228 may associate one or more layouts with specific dimensions of pixels or ranges of pixels.

Further, in one or more embodiments, the layout manager 228 associates one or more layouts with particular ratios of sizes, resolutions, or pixels of a display area. For example, similar to embodiments described above in connection with a library of client devices or common display specifications of client devices, the layout manager 228 may associate one or more layouts with particular length and width ratios of a display area. For instance, the layout manager 228 can associate a first layout with a 5:4 display ratio, a second layout with a 4:3 display ratio, a third layout with a 16:10 display ratio, a fourth layout with a 5:3 or 15:9 display ratio, and a fifth layout with a 16:9 display ratio. In some embodiments, the layout manager 228 associates layouts within a predetermined range of specific ratios. For example, the layout manager 228 can associate a layout for a display area within a predetermined range of a 5:4 display ratio, 4:3 display ratio, or other ratio of a display area.

Furthermore, the layout manager 228 may associate one or more layouts with an electronic survey to account for different orientations of a display area on a client device 102. For example, the layout manager 228 may associate a first layout with a horizontal display area and a second layout with a vertical display area. As such, in addition to providing an electronic survey in accordance with a horizontal or vertical layout of a display area on a client device 102, the different layouts may account for the changing orientation or size of a display area of a client device 102. For example, where a mobile device is frequently moved (e.g., rotated) between a vertical and a horizontal orientation when used by a user 104, the layout manager 228 may associate the first layout with display features corresponding to when the user 104 is holding the mobile device horizontally and the second layout with display features corresponding to when the user 104 is holding the mobile device vertically.

The survey system 106 may facilitate generation of the electronic survey content, layouts, and associated features in a variety of ways. For example, the survey system 106 may enable an author of an electronic survey to compose an HTML presentation to include survey content, associated layouts, and instructions for determining which layout to use based on features of a display area. Alternatively, the survey system 106 may provide an interface to the author (e.g., by way of an electronic device) that enables the author to compose survey questions, modify display features, and identify associated layouts to be used in conjunction with various combinations of display features. In one or more embodiments, the survey system 106 enables the author to compose the electronic survey without requiring the author to compose an HTML presentation or expressly assign specific CSS classes within the HTML presentation.

As mentioned above, and as illustrated in FIG. 2, the server device 101 may further include a communication manager 230. The communication manager 230 can facilitate sending and receiving data to and from the server device 101. In particular, the communication manager 230 can facilitate sending and receiving electronic communications. For example, the communication manager 230 can package survey content to be included in an electronic survey and format the electronic survey in any necessary form that is able to be sent through one or more communication channels and using an appropriate communication protocol, as described herein.

In one or more embodiments, the communication manager 230 can facilitate administration of an electronic survey to a user 104 by providing an electronic survey and associated layouts to the client device 102 and receiving responses to the electronic survey from the client device 102. To illustrate, the communication manager 230 can package survey content, associated layouts, and any additional instructions for how to present the survey content in a survey presentation 212 and provide the survey presentation 212 to the client device 102 for administration to a user 104 of the client device 102. Further, while the user 104 responds to survey questions and/or after the user 104 has completed the electronic survey, the communication manager 230 can receive the responses from the client device 104.

As mentioned above, and as shown in FIG. 2, the server device 101 can further include a data storage 232 including survey data 234 and presentation data 236. In particular, survey data 234 can include question data 238 representative of any survey content including questions and answer options that are presented to a user 104. The survey data 234 can further include results data 240 representative of any responses that a user 104 has given with respect to the questions of the electronic survey. Thus, the survey data 234 can include question data including survey content provided to a user 104 and corresponding responses that the user 104 has provided in response to each of the survey questions that makeup the electronic survey.

Additionally, as shown in FIG. 2, the data storage 232 can include presentation data 236 that includes information related to how content of an electronic survey is presented to a user 104. For example, the presentation data 236 can include layout data that defines how content of an electronic survey is displayed on a client device 102. Additionally, the presentation data 236 can include instructions that determine which layout from multiple layouts should be used in presenting survey content to the user 104.

In one or more embodiments, the survey data 234 and the presentation data 236 is stored and maintained on the server device 101. Alternatively, the survey data 234 and the presentation data 236 may be stored and maintained on a client device 102 and made accessible to the server device 101. Additionally, in one or more embodiments, a portion of the survey data 234 and/or a portion of the presentation data 236 is stored on the server device 101 while some of the survey data 234 and presentation data 236 is stored on the client device 102.

As mentioned above, the communication system 100 can include a client device 102 corresponding to a user 104. Further, as shown in FIG. 2, the client device 102 can include a user interface provider 202. The user interface provider 202 can provide a graphical user interface (or simply "user interface") that allows a user 104 to view, navigate, browse, respond to, or otherwise experience an electronic survey using the client device 102. For example, the user interface provider 202 can provide a user interface that facilitates presentation of an electronic survey on the client device 102 (e.g., on a display device). Likewise, the user interface provider 202 can provide a user interface that facilitates administration of an electronic survey to the user 104. For example, the user interface provider 202 can provide a user interface that allows the user 104 to respond to survey questions of an electronic survey.

More specifically, the user interface provider 202 may provide (e.g., by way of a display screen associated with the client device 102) a variety of interactive elements within the user interface. For example, the user interface provider 202 can cause the client device to present a survey question from an electronic survey to the user 102 and provide one or more answer options that a user 104 can select as responses to the survey questions. In particular, in presenting the answer options, the user interface provider 202 can provide one or more input elements that enable the user 104 to interact with the survey questions. For example, as will be described in further detail below, the user interface provider 202 can provide graphical elements with which the user 104 may interact and select one or more answer options corresponding to a survey question.

As further illustrated in FIG. 2, the client device 102 can include an input detector 204. In one or more embodiments, the input detector 204 can detect, identify, and/or receive a user interaction and translate the user interaction into a user input (e.g., a user command or request). As referred to herein, a "user interaction" refers to a single interaction, or combination of interactions, received from the user 104 by way of one or more input devices. In some embodiments, the input detector 204 can translate a combination of user interactions as a single input and/or translate a single user interaction into multiple inputs.

For example, the input detector 204 can detect a user interaction from a keyboard mouse, touch screen, or any other input device as a part of or in communication with the client device 102. In the event a touch screen is used as an input device, the input detector 204 can detect one or more touch gestures (e.g., swipe gestures, tap gestures, pinch gestures, or reverse pinch gestures) that user 104 provides via the touch screen. In one or more embodiments, the user 104 provides one or more touch gestures in relation to and/or directed at one or more graphical elements associated with answers corresponding to a survey question of an electronic survey via a user interface presented on a touch screen. The input detector 204 can additionally, or alternatively, receive data representative of a user interaction. For example, the input detector 204 can receive one or more user configurable parameters from the user 104, one or more user commands from the user 104, and/or any other suitable user input.

The user interface provider 202 can utilize user input and/or other data received from the input detector 204 to manage, control, and/or facilitate the use of a user interface. In general, in response to the input detector 204 detecting one or more user interactions, the user interface provider 202 can provide a user interface that allows the user 104 to view, edit, share, navigate, respond to, and/or otherwise experience survey content from an electronic survey within a user-friendly and intuitive user interface. Additionally, as will be explained in greater detail below, the input detector 204 can allow the user 104 to modify a display area as well as modify a layout in use by the client device 102 for presenting the survey content to the user 104.

As mentioned above, and as illustrated in FIG. 2, the client device 102 can further include a communication manager 206. The communication manager 206 can facilitate receiving and sending data to and from the client device 102. In particular, the communication manager 206 can facilitate sending and receiving electronic communications. The communication manager 206 can receive an electronic survey from the server device 101 including survey content, layouts, and instructions associated with presenting the survey content to the user 104 in accordance with one or more layouts. To illustrate, where the server device 101 has packaged survey content, associated layouts, and instructions for how to present the survey content in a survey presentation 212, the communication manager 206 can receive the survey presentation 212 for presenting the electronic survey to the user 104. Additionally, as the user 104 responds to survey questions and/or completes the electronic survey, the communication manager 206 can provide the user's 104 responses for the electronic survey to the server device 101.

As illustrated in FIG. 2, the client device 102 can further include a presentation manager 208 for providing an electronic survey to the user 104 in accordance with a determined layout. In one or more embodiments, the presentation manager 208 can include an application on the client device 102 specifically designed for administering surveys to respondents. For example, the presentation manager 208 may include an application (e.g., a mobile application) associated with or provided to the client device 102 from the survey system 106. Alternatively, in one or more embodiments, the presentation manager 208 can include a browser window (e.g., Internet browser) capable of presenting an electronic survey to the user 104 within the browser window. For example, the presentation manager 208 can provide an HTML presentation that includes the electronic survey in accordance with a determined layout associated with the electronic survey.

As illustrated in FIG. 2, the presentation manager 208 can execute, present, or otherwise provide a survey presentation 212 that includes survey content provided to the user 104 in accordance with a determined layout. In particular, the survey presentation 212 can include question data 214, layout data 216, a feature detector 218, and a layout identifier 220 to facilitate providing an electronic survey to the user 104 in accordance with a determined layout. As mentioned above, in one or more embodiments, the client device 102 receives the survey presentation 212 from the server device 102. Additionally, in one or more embodiments, the survey presentation 212 may include an entire electronic survey including survey content for multiple questions and associated layouts. Alternatively, the survey presentation 212 can include individual survey questions and associated layouts received from the server device 101.

As mentioned above, the survey presentation 212 can include question data 214. The question data 214 can include any data representative of one or more survey questions and answer options that make up an electronic survey. For example, the question data 214 can include survey content that includes a survey question and each corresponding answer option that a user 104 may select when answering the survey question. Additionally, the question data 214 can include a survey question and any number of response options such as, but not limited to, a ranking, a text-box, multiple choices, a score, or other answer option that depends on the type of survey question. For example, as mentioned above, a survey question can include multiple choice, open-ended, ranking, scoring, summation, demographic, dichotomous, differential, cumulative, dropdown, matrix, net promoter score (NPS), singe textbox, heat map, or other type of question that may be included within an electronic survey.

Additionally, as mentioned above, the survey presentation 212 can include layout data 216 representative of one or more layouts that are associated with an electronic survey. For example, the layout data 216 can include any number of layouts associated with any individual survey question. Alternatively, the layout data 216 can include one or more layouts associated with the electronic survey as a whole. As discussed above, the layout data 216 can include instructions on how survey content is displayed on the client device 102. The layout data 216 can further include instructions with regard to one or more input elements to be presented via the user interface. The layout data 216 can further include one or multiple features corresponding to each layout that determine which layout from a plurality of layouts the client device 102 should use when presenting survey content to the user 104.

Additionally, the survey presentation 212 can include any number of instructions for facilitating presentation of survey content to a user 104 in accordance with a determined layout. For example, as illustrated in FIG. 2, the survey presentation 212 can include a feature detector 218 to facilitate identifying one or more features of a display area provided to the user 104 via the client device 102. In one or more embodiments, the feature detector 218 causes the client device 102 to identify one or more features of a display area of the client device 102. For example, as discussed above, the client device 102 can identify a type of the client device, a size of a graphical user interface, capabilities of the client device 104 with respect to the display area, dimensions and other features of a display window used for presenting the survey content to the user 104, or other feature(s) related to the presentation of the electronic survey to the user 104. In one or more embodiments, the feature detector 218 includes instructions within an HTML presentation (e.g., the survey presentation 212) that cause the presentation manager 208 or other component on the client device 102 to identify any number of display features applicable to the presentation of the survey content via the client device 104.

Further, as shown in FIG. 2, the survey presentation 212 can include a layout identifier 220 to facilitate determining a layout for providing survey content to the user 104 via a user interface of the client device 102. For example, the layout identifier 220 may identify which layout, from a plurality of layouts, corresponds to the identified features detected by the feature detector 218. In one or more embodiments, the layout identifier 220 includes instructions within an HTML presentation (e.g., the survey presentation 212) that cause the presentation manager 208 to identify a corresponding layout based on one or more detected features of the display area.

As mentioned above, and as shown in FIG. 2, the client device 102 can further include a data storage 210 device data 222 and display data 224. In particular, the device data 222 can include information associated with the client device 102 including, for example, specifications of the device, dimensions (e.g., physical dimensions, logical dimensions, dimension ratio) of a display device, and capabilities of the client device 102 with respect to a user interface or display area. In one or more examples, the presentation manager 208 accesses the device data 222 when identifying features of a display area and determining corresponding layouts based on the features.

Additionally, as shown in FIG. 2, the data storage 210 can include display data 224 that includes data representative of a display area used for providing survey content to a user 104 of the client device 102. For example, the display data 224 can include specifications or dimensions of a display area in use for providing survey content via a user interface of the client device 102. In one or more embodiments, the display data 224 can include dimensions (e.g., physical dimensions, logical dimensions, dimension ratio) of an active display area presenting the survey content. Additionally, the display data 224 can include display settings associated with the client device 102 and/or an application (e.g., presentation manager 208) that facilitates providing the survey content to the user 104.

FIGS. 3A-6D illustrate examples of client devices and display areas in accordance with various features and functionality described herein. In particular, FIGS. 3A-6D illustrate various user interfaces including presentations of survey content in accordance with a determined layout based on features of a display area and/or other factors. It is appreciated that particular characteristics and details with respect to each layout may apply to other layouts described herein. Additionally, it is appreciated that a presentation manager 208 can identify or otherwise determine a layout from a plurality of layouts based on display features described in connection with one or more embodiments herein. For example, the presentation manager 208 may determine a layout based on display features described in connection with different display areas described herein.

Figure 3A:
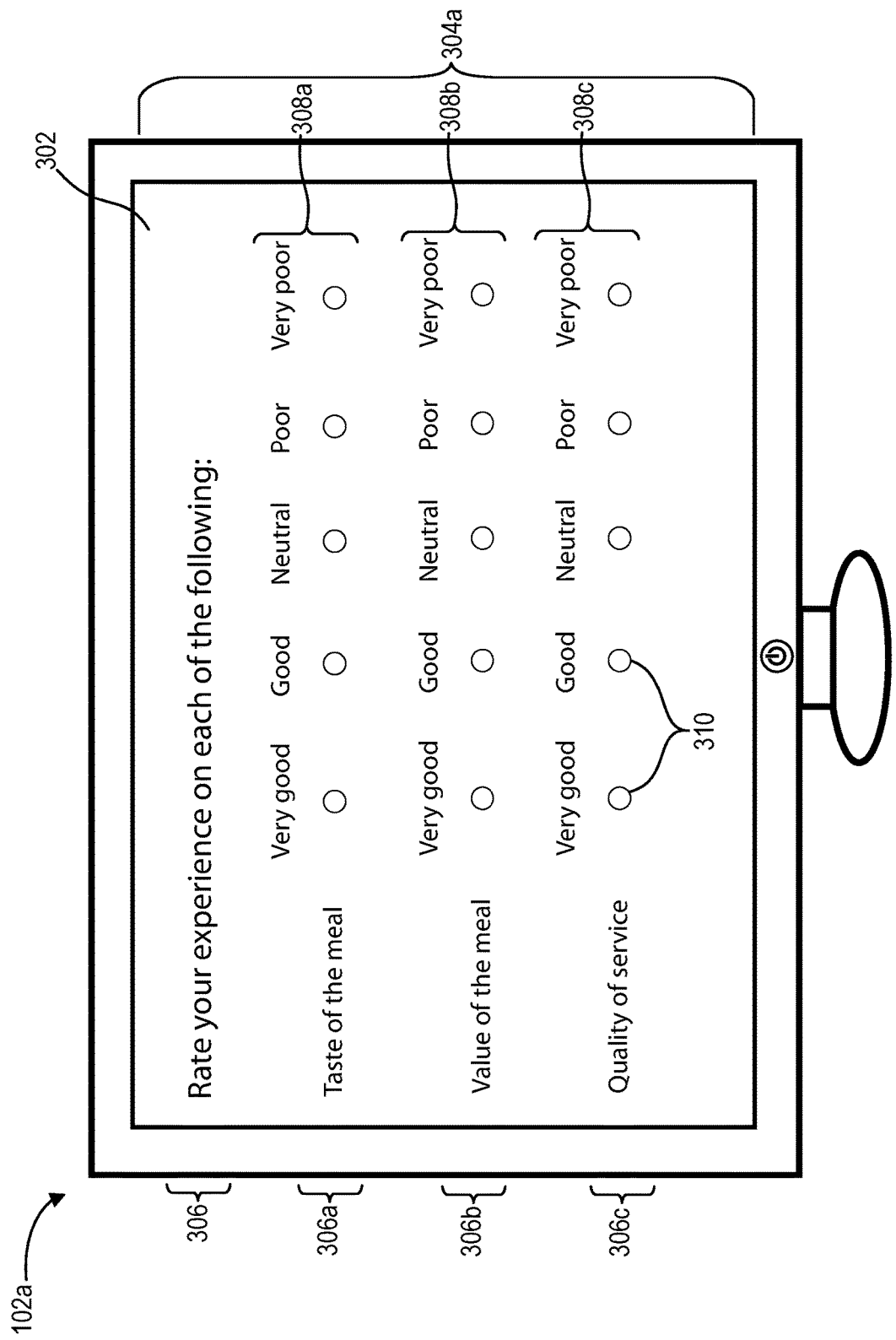

FIG. 3A illustrates an example client device 102a including a graphical user interface 302. In particular, FIG. 3A illustrates an example client device 102a that may implement one or more features and functionalities described above in conjunction with the client device 102 of FIGS. 1 and 2. Additionally, in one or more embodiments, the client device 102a implements one or more features and functionalities described above in connection with the server device 101. In one or more embodiments, the client device 102a is a desktop computer, laptop, or other personal computing device. As discussed below in reference to FIG. 9, other client devices (tablets, laptops, mobile devices, etc.) can implement the features and methods of various embodiments. Thus, FIGS. 3A-6D provide illustrative examples of client devices and display areas to aid in the description of various features and methods of one or more embodiments.

As illustrated, the client device 102a can provide a presentation of survey content via the graphical user interface 302 of the client device 102a. In particular, the client device 102a can provide a display area 304a within the graphical user interface 302 that includes the survey content. As illustrated in FIG. 3A, the display area 304a can include the entire graphical user interface 302 that uses the entire display area of the display device. Alternatively, the display area 304a can include a portion of the graphical user interface 302 or only a portion of the area of the display device.

As shown in FIG. 3A, the client device 102a can provide survey content including questions and answer options. In one or more embodiments, the survey content includes a main question 306 and any number of sub-questions 306a-c corresponding to the main question 306. For example, as illustrated in FIG. 3A, the main question 306 recites "Rate your experience on each of the following," and has corresponding sub-questions 306a-c. In particular, the main question 306 corresponds to a first sub-question 306a ("Taste of the meal"), a second sub-question 306b ("Value of the meal"), and a third sub-question 306c ("Quality of service").

Each of the sub-questions 306a-c correspond to a plurality of answer options 308a-c including, for example, "Very Good," "Good," "Neutral," "Poor," and "Very Poor." As shown, each sub-question 306a-c can correspond to a respective plurality of answer options 308a-c. As shown in FIG. 3A, each of the answer options 308a-c may include the same options for each sub-question 306a-c. Alternatively, each of the sub-questions 306a-c can have different answer options 308a-c.

As shown in FIG. 3A, the graphical user interface 302 can include one or more input elements 310 with which a user 104 can interact to select one or more answer options 308a-c. In particular, the input elements 310 can include selectable answer bubbles that a user 104 selects using an input device. For example, where the client device 102a is a desktop computer that includes a keyboard and mouse interface, the user 104 can select an input element 310 for each of the sub-questions 306a-c indicating a rating for each of the respective sub-questions.

Additionally, as illustrated in FIG. 3A, the client device 102 can present the survey content to the user 104 in accordance with a determined layout for the electronic survey or, alternatively, for each of the main question 306 and/or sub-questions 306a-c. For example, as illustrated in FIG. 3A and as described above in connection with FIG. 2, the presentation manager 208 can determine a layout that provides a complete display of the main question 306 at the top of the display area 304a and each sub-question 306a-c in an area below the main question 306. Additionally, based on dimensions and/or other features of the display area 304a, the presentation manager 208 may determine a layout that includes a presentation of the complete main question 306 with each of the sub-question 306a-c and corresponding answer options 308a-c without abbreviating or hiding the display of one or more sub-questions 306a-c or answer options 308a-c. Additionally, in accordance with the layout illustrated in FIG. 3A, where the display area 304a has a horizontal orientation (e.g., the horizontal dimensions are larger than the vertical dimensions), the presentation manager 108 may determine a layout that includes sub-questions 306a-c on a left portion of the display area 304a with corresponding answer options to the right of each corresponding sub-question 306a-c, as shown in FIG. 3A.

Figure 3B:
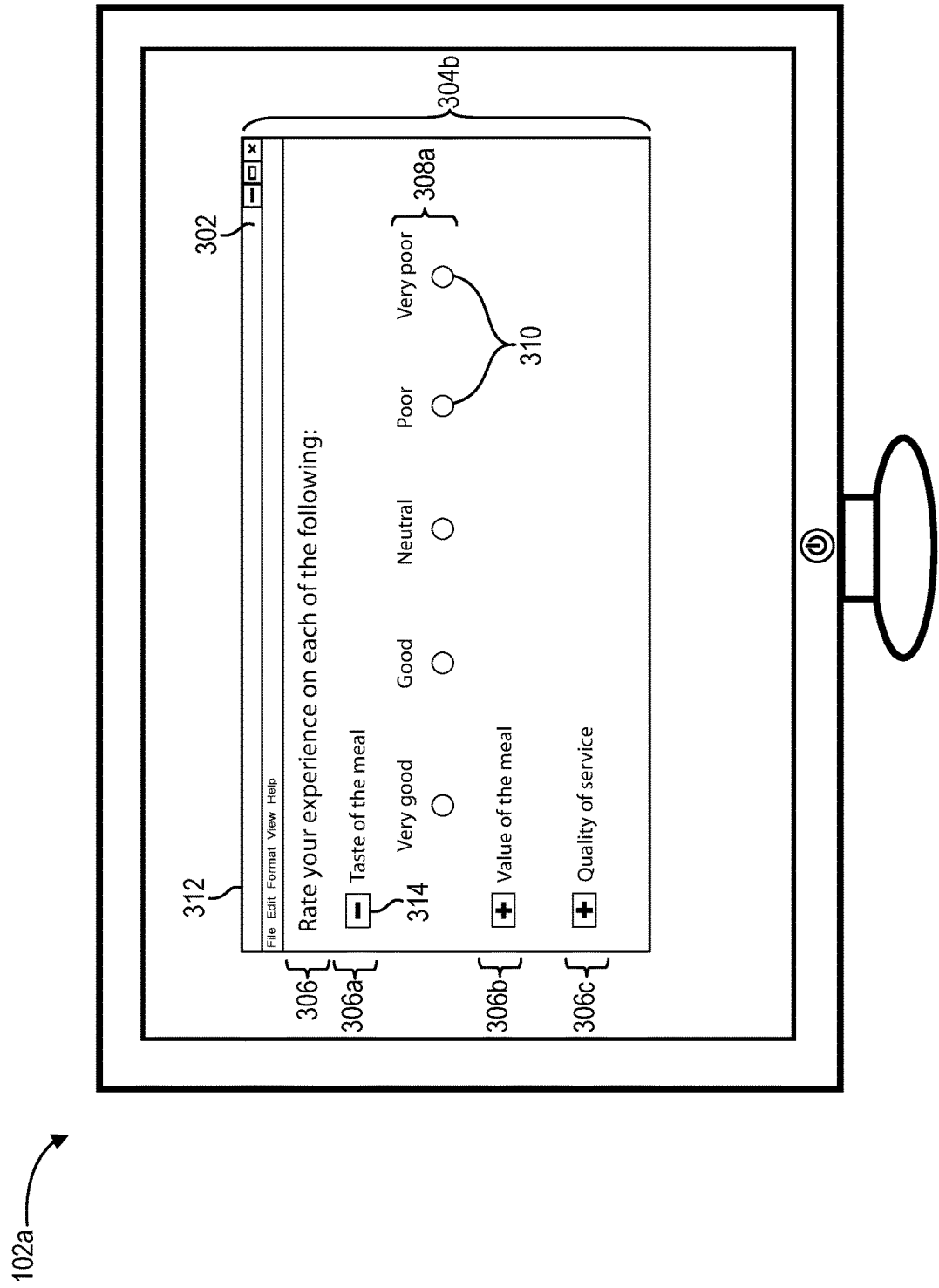

Referring now to FIG. 3B, the client device 102a provides the graphical user interface 302 defined by an application window 312 that includes the display area 304b within a portion of the application window 312. In particular, the application window 312 can include an application specially equipped for administering electronic surveys to the user 104 via the graphical user interface 302 of the client device 102a. Alternatively, the application window 312 can include an Internet browsing window that provides a presentation (e.g., an HTML presentation) of the electronic survey within the application window 312.

While the survey presentation provided within the display area 304b of FIG. 3B may include similar survey content as described above in connection with FIG. 3A, the presentation manager 208 can determine a different layout for presenting the survey content to a user 104 based on different features of the display area 304b within the application window 312 as the display area 304a described above in connection with FIG. 3A. For example, instead of providing the main question, 306, sub-questions 306a-c, and corresponding answer options 308a-c together in their entirety as shown in FIG. 3A, the presentation manager 208 can determine a layout that presents only a portion of the survey content, as shown in FIG. 3B. For example, the display area 304b includes the main question 306, the sub-questions 306a-c, and a first set of answer options 308a corresponding to the first sub-question 306a without providing the answer options 308b-c for the second and third sub-questions 306b-c. Additionally, as shown in FIG. 3B, the display area 306b includes input elements 310 for the first answer options 308a.

Furthermore, as shown in FIG. 3B, the selected layout can include graphical elements 314 that enable a user 104 to interact with the survey content and collapse or expand survey content within the display area 304b. For example, a user 104 may select a graphical element 314 of the first sub-question 306a to collapse the answer options 308a corresponding to the first sub-question 306a. Additionally, the user 104 may select a graphical element 314 of the second sub-question 306b or third sub-question 306c and expand the second answer options 308b or third answer options 308c. In one or more examples, selecting the graphical element 314 of the second sub-question 306b will collapse the answer options 308a of the first sub-question 306a. Alternatively, selecting the graphical element 314 can cause the second sub-question 306b to expand without also collapsing the first sub-question 306a.

In determining the layout shown in FIG. 3B, the presentation manager 208 may determine that the dimensions (e.g., display features) of the display area 304b correspond to a layout that presents one or more expanded sub-question 306a and corresponding answer options 308a while collapsing any additional sub-questions 306b-c. For example, the presentation manager 208 may determine horizontal and vertical dimensions of display area 304b within the application window 312 and determine that an accordion (e.g., collapsible) layout should be used instead of the expanded or full layout shown in FIG. 3A. In particular, the presentation manager 208 may utilize this accordion layout as opposed to shrinking the text of the survey content or cutting off portions of the survey content as would be necessary to maintain the full or expanded layout.

Additionally, the presentation manager 208 can change the layout used, or determine a new layout, for the display area 306b with changing features of the display area 304b. For example, where a user 104 can interact with the application window 312 to shrink, expand, or otherwise change dimensions of the application window 312, and thus change one or more display features of the display area 306b, the presentation manager 208 may detect one or more changed display features and determine a different layout for presenting survey content within the display area 306b. For example, if a user 104 maximizes the application window 312 to fill the screen of the display device or changes a setting of an application to provide a larger display area 306b within the graphical user interface 302, the presentation manager 208 may determine that a full layout similar to the layout described in connection with FIG. 3A should be used. Alternatively, if the user 104 shrinks the application window 312 or otherwise alters features of the display area 306b, the presentation manager 208 can determine that a different layout should be used in presenting the survey content to the user 104. For example, the presentation manager 108 can use the layout illustrated in FIG. 3B in response to a user 104 shrinking the application window 312.

In one or more embodiments, the presentation manager 208 alters the layout in response to changing display features while providing the same survey presentation 212. In particular, rather than re-rendering a new webpage or survey presentation 212 having a different layout in response to detecting a changed display feature, the presentation manager 208 may determine a new layout previously associated with the same survey content and provide the same survey content in accordance with the new layout. For example, where the survey presentation 212 includes an HTML presentation having associated CSS classes representative of layouts, the presentation manager 208 can simply remove or add a layout corresponding to a detected display feature or changed feature of the display area 304b without re-rendering the HTML presentation or providing a different webpage providing similar, but different survey content. Rather, the presentation manager 208 can provide the same content in accordance with a different CSS class.

FIG. 3C illustrates an example client device 102b including a graphical user interface 302 similar to the graphical user interface described above in connection with FIGS. 3A-3B. In particular, FIG. 3C illustrates an example client device 102b that can implement one or more features and functionalities described above in connection with the client device of FIGS. 1 and 2. Additionally, as shown in FIG. 3C, the client device 102b can be a cell phone, tablet, or other mobile device. For example, the client device 102b of FIG. 3C may have a smaller display device than the display device of the client device 102a illustrated in FIGS. 3A-3B.

As shown in FIG. 3C, the client device 102b can provide the survey content within a display area 304c of the graphical user interface 302. Additionally, in one or more embodiments, the client device 102b can provide the survey content on a graphical user interface 302 that includes a touch screen interface. As shown in FIG. 3C, the graphical user interface 302 and display area 304c can extend across the entire surface of the touch screen. Alternatively, the graphical user interface 302 and/or display area 304c can extend over a portion of the touch screen.

As shown in FIG. 3C, the client device 102b can provide survey content including a main question 306 and sub-questions 306a-c. Additionally, the client device 102b can provide one or more answer options 308 corresponding to some or all of the sub-questions 306a-c. For example, as shown in FIG. 3C, the client device 102b can provide the main question 306, an expanded first sub-question 306a including corresponding answer options 308a, and collapsed second and third sub-questions 306b-c. Additionally, as shown in FIG. 3C, the graphical user interface 302 can include input elements 310 with which a user 104 can interact and select one or more of the answer options 308a. As shown in FIG. 3C, the input elements 310 can include bubbles that a user 104 can tap or otherwise select. For example, a user 104 may select an input element 310 by tapping a bubble on the touch screen. Alternatively, the user 104 may select one of the answer options 308a by tapping on text next to the bubble or other graphical icon corresponding to a particular answer option.

As described above, the presentation manager 208 can analyze one or more display features of the display area 304c and determine an appropriate layout from a plurality of associated layouts to use in presenting the survey content via the graphical user interface 302. For example, the presentation manager 208 may identify that the display area 304c has a vertical orientation and determine a corresponding layout based on the vertical orientation of the display area 304b. Additionally or alternatively, the presentation manager 208 may identify that the display area 304c is part of a touch screen interface and identify a layout that corresponds to client device 102b having a touch screen interface. Alternatively, the presentation manager 208 can identify that the client device 102b or display area 304c of the client device 102b has dimensions or a display ratio that corresponds to a library of ratios or dimensions of common mobile devices or display areas and determine a layout corresponding to the particular dimensions or display ratio. In determining the layout, the presentation manager 208 can consider a single feature, combination of features, or hierarchy of features. Additionally, the presentation manager 208 can consider one or more characteristics of the survey content (e.g., question type) in determining an appropriate layout.

As illustrated in FIG. 3C, the presentation manager 208 can determine a layout for presenting the main question 306 and each sub-question 306a-c listed below the main question 306. Additionally, the layout can specify that the first sub-question 306a is expanded to include the first corresponding answer options 308a listed vertically under the corresponding sub-question 306a. Further, the layout can specify that each additional sub-question 306b-c listed below the main question 306 is collapsed without showing corresponding answer options. Additionally, as shown in FIG. 3C, the layout can include one or more graphical elements 316a-c corresponding to one or more sub-questions 306a-c that enable a user 104 to select a sub-question 306a-c and expand or collapse the sub-question 306a-c corresponding to the selected graphical element 316a-c. In one or more embodiments, the presentation manager 208 determines a layout that includes graphical elements 316a-c upon identifying that the display area 304c includes a touch screen interface.

In providing the graphical elements 316a-c, the client device 102b can enable a user 104 to interact with the survey content. For example, as illustrated in FIG. 3D, a user may select the second graphical element 316b corresponding to the second sub-question 306b and expand the second sub-question 306b to display the corresponding answer options 308b. In one or more embodiments, the layout indicates that expanding the second sub-question 306b causes the first sub-question 306a to collapse, as shown in FIG. 3D. Alternatively, the layout may indicate that the first sub-question 306a remain expanded in response to the user 104 selecting the second graphical element 316b.

Figure 3E:
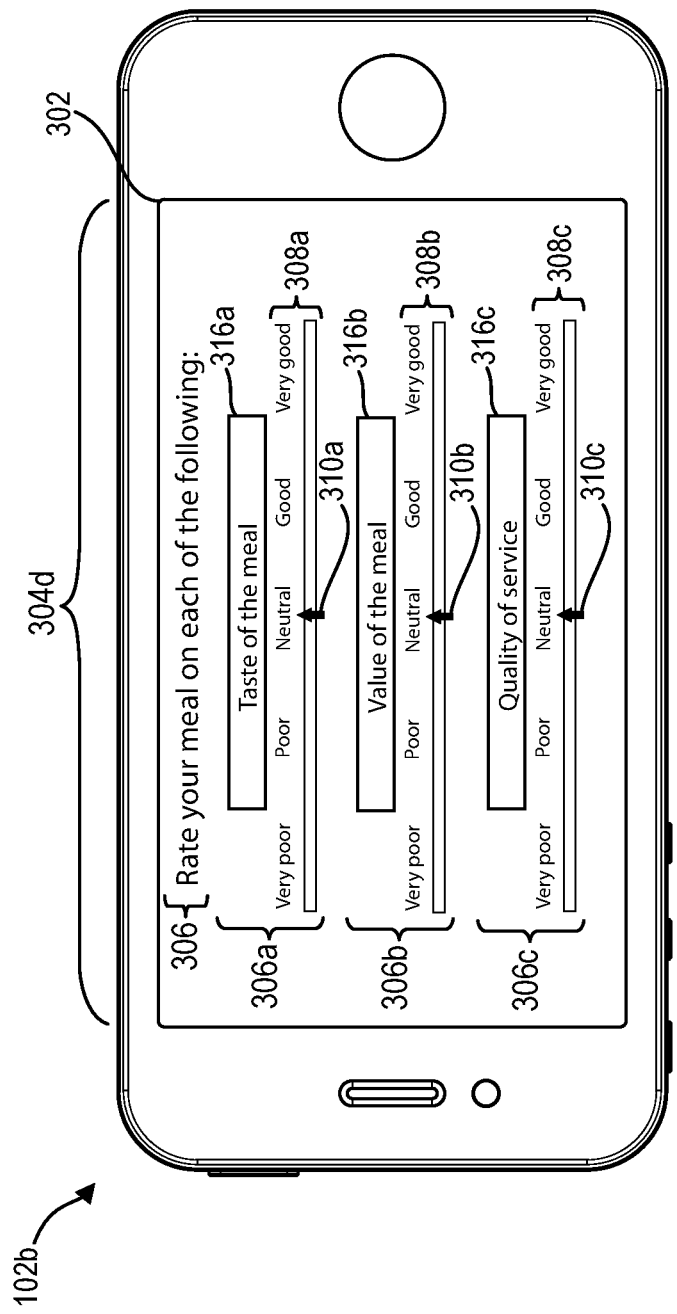

As mentioned above, the presentation manager 208 can determine a new layout based on changing features of a display area 304. For example, as shown in FIG. 3E, a user 104 can change an orientation or dimensions of the display area 304d by holding the client device 102b differently. For example, FIGS. 3C-D show a client device 102b in a vertical orientation while FIG. 3E shows the client device 102b in a horizontal orientation. In particular, FIGS. 3C-D illustrate example layouts of how survey content is presented on the client device 102b in accordance with a display area 304c having a vertical orientation, while FIG. 3E shows an example layout of how survey content is presented on the client device 102b in accordance with a display area 304d having a horizontal orientation.

For example, as illustrated in FIG. 3E, the client device 102b can provide the survey content including a main question 306 along the top of the display area 304d and sub-questions 306a-c positioned below the main question 306. Additionally, the client device 102b can present each of the answer options 308a-c below each of the corresponding sub-questions 306a-c, as shown in FIG. 3E. For example, as shown in FIG. 3E, the layout may include input elements 310a-c for each of the sub-questions 306a-c. In particular, the layout may include an input element 310 of a slider or scroll bar that the user 104 can position via the touch screen of the client device 102b to one of the answer options 308. For example, as shown in FIG. 3E, each of the sub-questions 306a-c can have a corresponding slide bar 310a-c with which the user 104 can interact in order to select one or more of the answer options 308a-c.

It is appreciated that the input elements 310 may differ based on one or more features of the display area 304d. For example, the application manager 208 can determine a layout including the slider element based on the horizontal orientation of the display area 304d. Additionally, the application manager 208 can determine a layout including the slider element based on both the horizontal orientation of the client device 102b and the touch screen interface of the display area 304d. As an example, where a client device 102 is a desktop computer having a keyboard and mouse interface, the determined layout may include multiple choice bubbles that a user 104 selects with the mouse or keyboard. Alternatively, where the client device 102 is a mobile device having a touch screen interface, the determined layout may include the slider input element as shown in FIG. 3E.

FIGS. 4A-4D show additional examples of display areas 404a-d including various layouts having different characteristics. For example, as shown in FIG. 4A, a display area 404a can include a survey question 406 and corresponding answer options 408 presented to a user 104 within the display area 404a. As illustrated in FIG. 4A, the survey question 406 recites "On a scale of 1-10, rate your overall dining experience" and corresponds to answer options 408 ranging from 1-10. Additionally, as illustrated in FIG. 4A, each of the answer options 408 can include an input element 410a including an answer bubble that a user 104 may select when responding to the survey question 406. Additionally, as shown in FIG. 4A, the presentation manager 208 can determine a layout that includes the survey question 406 at the top of the display area and each of the ten answer options 408 displayed in a single row under the survey question 406.

Additionally, as shown in FIG. 4A, the presentation manager 208 may provide a selectable option 420 that enables a user 104 to determine a new layout or alter a layout provided via the display area 404a. For example, in response to receiving a user selection of the selectable option 420, the presentation manager 208 can provide the survey content including the survey question 406 and corresponding answer options 408 using a different layout. For example, a user 104 can view the survey content in accordance with each of a plurality of layouts by selecting the selectable option 420 and viewing the survey content using each of the layouts. Alternatively, rather than navigating through each layout, the presentation manager 208 can provide, within a graphical user interface, a listing of layouts or layout options that a user 104 can select. In response to the user selecting a particular layout, the presentation manager 208 can provide the survey content in accordance with the selected layout.

For example, in response to receiving a selection of the selectable option 420, the presentation manager 208 can provide a display area 404b as shown in FIG. 4B. In particular, the display area 404b includes the survey question 406 and corresponding answer options 408. Additionally, the layout can include a different input element 410b from the input element of the display area 404a illustrated in FIG. 4A. For example, where a first display area 404a includes answer bubbles 410a, the second display area 404b can include a slider 410b or other type of input element 410 with which a user 104 can interact when responding to a survey question.

FIG. 4C illustrates another example layout in which a display area 404c includes a survey question 406 and corresponding answer options 408 similar to display areas 404a-b described above in connection with FIGS. 4A-4B.

Additionally, as shown in FIG. 4C, the layout can include an input element 410c including a carousel input with which the user 104 can interact when selecting a response to the survey question 406. For example, the user 104 can scroll through the carousel input to select one of the numbers 1-10 to indicate a ranking of the user's overall dining experience. In one or embodiments, the carousel input rotates from 1 to 10 with an input of 1 when the carousel is rotated all the way to the left and an input of 10 when the carousel is rotated all the way to the right. Alternatively, rather than having end points, the carousel can continue rotating in a single direction and move between 10 and 1 when scrolling through the carousel input in either direction.

As described above, the presentation manager 208 can present the survey content in accordance with the different layouts in response to receiving a user selection of the selectable option 420. For example, in response to a first user selection, the presentation manager 208 can switch between a first layout including a first input element 410a (e.g., selection bubbles) illustrated in FIG. 4A to a second layout including a second input element 410b (e.g., slider). Additionally, in response to a second user selection, the presentation manager 208 can switch between the second layout including the second input element 410b to a third layout including a third input element 410c (e.g., carousel). Alternatively, rather than scrolling through different layouts in response to a user selection, the presentation manager 208 can provide one or more selectable options of layouts and/or particular input elements 410 that the user 104 can select. The presentation manager 208 can further provide a layout in response to the user selection of the particular layout and/or input element 410.

Additionally, in one or more embodiments, the presentation manager 208 can determine a layout from a plurality of layouts having similar presentations of survey content while having different input elements. In particular, determining a layout may include determining an input element from a plurality of input elements based on one or more features of the display area 404. For example, as illustrated in FIGS. 4A-4C, the display areas 404a-c can include identical survey content having different input elements 410a-c based on different features between the display areas 404a-c and/or capabilities of corresponding client devices 102 or features of a user interface.

To illustrate, the first display area 404a illustrated in FIG. 4A can represent a display area of a desktop computer having a mouse and/or keyboard interface. Upon identifying one or more features including the mouse and/or keyboard interface, the presentation manager 208 may provide the input element 410a including the answer bubbles. Additionally, the second display area 404b illustrated in FIG. 4B can represent a mobile device held horizontally having a touch screen interface. Upon identifying one or more features including a screen size of the mobile device and/or the touch screen interface, the presentation manager 208 may provide the input element 410b including the slider element. Further, the third display area 404c illustrated in FIG. 4C can represent a mobile device held vertically having a touch screen interface. Upon identifying one or more features including the screen size/orientation of the mobile and/or the touch screen interface, the presentation manager 208 may provide the input element 410c including the carousel element.

FIG. 4D illustrates a reduced layout in which a display area 404d includes a reduced survey question 406a, corresponding reduced answer options 408a, and a selectable option 420 for a user 104 to select a different layout. In particular, the reduced survey question 406a represents a shortened version of the survey question 406 shown in FIGS. 4A-4C. Additionally, the reduced answer options 408a represent a shortened version of the answer options 408 shown in FIGS. 4A-4C.

In one or more embodiments, the presentation manager 208 determines the reduced layout in response to detecting or otherwise identifying that the display area 404d has limited space for presenting the survey content via the display space 404d. For example, rather than presenting the full survey question 406, the presentation manager 208 can present a reduced survey question 406a including a shortened version of the survey question 406 or a partial version of the survey question 406 as shown in FIG. 4D. Additionally, rather than showing each of the answer options 408, the presentation manager 208 can provide reduced answer options 408a including only a portion or a shortened version of the answer options 408 from other layouts. Additionally, while the reduced layout includes input elements 410d of answer bubbles, it is appreciated that the presentation manager 208 may present a slider element, carousel element, or other input element in place of the input element 410d illustrated in FIG. 4D.

FIG. 5A-5B illustrate example client devices 102a-b including similar features and functionality as other client devices described herein. For example, FIG. 5A illustrates a desktop computer, laptop, or other personal computing device providing survey content via a graphical user interface 302. In particular, as shown in FIG. 5A, the client device 102a can present survey content via a display area 504a. Additionally, FIG. 5B illustrates a cell phone, tablet, or other mobile device providing similar survey content as shown in FIG. 5A via a graphical user interface 302. In particular, as shown in FIG. 5B, the client device 102b can present survey content via a display area 504b.

As illustrated in FIG. 5A, a presentation manager 208 can provide the survey content within the display area 504a in accordance with a determined layout. For example, the presentation manager 208 can consider various features of the display area 504a including features of the client device 102a, graphical user interface 302, dimensions of the display area 504a or other features described herein to determine a layout for presenting the survey content to a user 104. As described above, the layout may determine how any individual survey question or portion of a survey question is presented to user 104. Additionally, as shown in FIG. 5A, the layout may determine how an entire electronic survey or multiple survey questions are presented to the user 104.

For example, the display area 504a includes a first question 506a that recites "Rate your experience on each of the following" followed by multiple sub-questions 507 including "Taste," "Value," and "Service." As shown in FIG. 5A, the layout may include an indication of previously answer questions or sub-questions. For example, each of the sub-questions 507 include a corresponding answer "Very Good," "Good," and "Poor," representing previously received responses from the user 104 for each of the respective sub-questions 507. Additionally, the display area 504a includes a second question 506b that recites "Rate your overall dining experience" followed by an indication of the user's answer of "7." It is appreciated that the presentation manager 208 can present any of the first question 506a, sub-questions 507, and second question 506b using any of the above layouts, input elements, graphical elements, and other features described herein.

Additionally, as shown in FIG. 5A, the display area 504a can include a third survey question 506c that recites "Overall, were you satisfied with your experience at our restaurant?" Below the third question, the display area 504a can include selectable answer options 508c of "yes" and "no." The display area 504a further includes a fourth survey question 506d that states "Please include any additional comments about your dining experience" and includes an input element 510 (e.g., a text box) within which the user 104 can provide a response to the fourth survey question 506d. In one or more embodiments, the client device 102b presents the fourth survey question 506d as a follow up to the third survey question 506c. In particular, the layout may include instructions to provide the follow up question in response to a predetermined response to the third survey question 506c. For example, the layout may include instructions to only provide the fourth survey question 506d in response to a "no" response to the third survey question 506c.

Further, as shown in FIG. 5A, each of the questions 506, sub-questions 507, and/or corresponding answer options may include graphical elements 516a that a user 104 can select via interactions with the graphical user interface 302 (e.g., a touch gesture). For example, a user 104 may select a graphical element corresponding to the first question 506a and collapse each of the corresponding sub-questions 507 to display the first question 506a without the corresponding sub-questions 507. Additionally, the user 104 can select one or more of the questions 506 and/or sub-questions 507 to expand the respective questions and cause the client device 102a to display an input element with which the user 104 can interact and respond to the question.

FIG. 5B illustrates another example layout in which a display area 504b includes similar survey content as described above in connection with FIG. 5A provided to a user 104 in accordance with a different layout from the layout of FIG. 5A. In particular, the display area 504b includes a reduced first question 506a including a reduced or partial version of the first question 506a shown in FIG. 5A. Additionally, the display area 504b includes sub-questions 507 corresponding to the first question 506a. The display area 504b further includes a second question 506b including a reduced or partial version of the second question 506b shown in FIG. 5A. Additionally, the display area 504b includes a third question 506c that represents a reduced or partial version of the third question 506c shown in FIG. 5A. Further, the reduced third question 506c can include corresponding answer options 508c. Further, as shown in FIG. 5B, each of the questions, sub-questions, and answer options may include a corresponding graphical element 516b that enable a user to respond to expand and/or collapse various questions and sub-questions. Additionally, one or more graphical elements 516b can enable a user to select one or more answer options 508c.

Additionally, as shown in FIG. 5B, the layout may exclude one or more survey questions based on various features of the display area 504b and/or client device 102b. For example, while display area 504b includes the first three questions 506a-c, the layout shown in FIG. 5B excludes the fourth question 506d shown in FIG. 5A. In one or more embodiments, the presentation manager 208 excludes the fourth question 506d based on interface capabilities of the client device 102b or other display features. For example, because the client device 102b is a mobile device with a touch screen interface that is inconvenient for providing text-based responses, the presentation manager 208 may exclude the fourth question 506d based on detecting that the client device 102b uses the touch screen interface, that the client device 102b is a mobile device, or other identified feature(s) of the display area 504b.

Figure 6A:
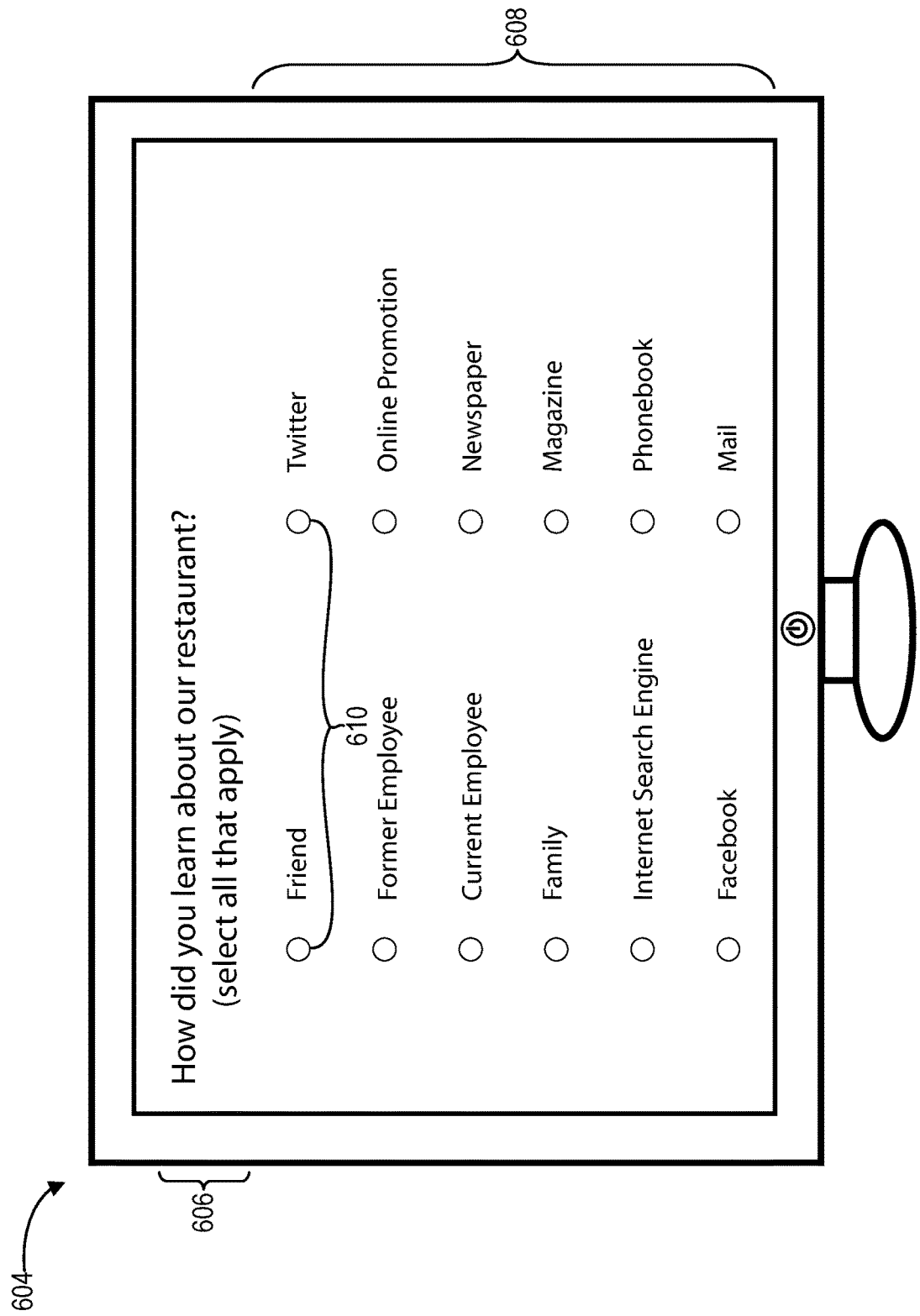

FIG. 6A illustrates another example display area 604 including a survey question 606 and corresponding answer options 608. In particular, survey question 606 recites "How did you learn about our restaurant? (select all that apply)." Additionally, the answer options 608 include "Friend," "Former Employee," "Current Employee," "Family," "Internet Search Engine," "Facebook," "Twitter," "Online Promotion," "Newspaper," "Magazine," "Phonebook," and "Mail." The display area 604 may further include an input element 610 for each of the answer options 608. For example, the input elements 610 may include an answer bubble for each of the answer options 608.

As shown in FIG. 6A, the display area 604 includes adequate space for providing the survey question 606 and each of the corresponding answer options 608. For example, the display area 604 may represent a display area on a desktop computer, laptop, or other computing device that includes dimensions and space that enable the presentation manager to present the entire survey question and each of the corresponding answer options 608 to a user 104.

Alternatively, in one or more embodiments, a display area 604 may have one or more features that prevent the presentation manager 208 from presenting the survey question 606 and all of the corresponding answer questions 608 within the display area 604. As an example, the survey question 606 can include more answer options 608 than can reasonably fit within the display area 604. In one or more embodiments, the presentation manager 208 may detect or otherwise identify a characteristic of the survey content that is incompatible with one or more features of the display area 604. For example, where a survey question includes a number of answer options that are unable to fit within the display area 604 using one or more of a plurality of associated layouts, the presentation manager 208 may determine a plurality of layouts for presenting the survey content to the user 104. For instance, in one or more embodiments, the presentation manager 208 provides portions of the survey content in accordance with multiple layouts for each respective portion.

For example, FIGS. 6B-6D illustrate an example layout that enables a client device 102 to present the survey content to the user 104. In particular, rather than providing the survey question via a single display area 604 as shown in FIG. 6A, the presentation manager 208 can provide the survey content via multiple display areas 604a-c. For example, FIG. 6B illustrates a first display area 604a including the survey question 606 and a first group of answer options 608a with corresponding input elements 610. Additionally, FIG. 6C illustrates a second display area 604b including the survey question 606 and a second group of answer options 608b. Further, FIG. 6D illustrates a third display area 604c including the survey question 606 and a third group of answer options 608c. In one or more embodiments, the layout separates the groups of answer options 608a-c according to source type. For example, the first group of answer options 608a include word of mouth sources, the second group of answer options 608b include online sources, and the third group of answer options 608c include printed sources.

Figure 7:
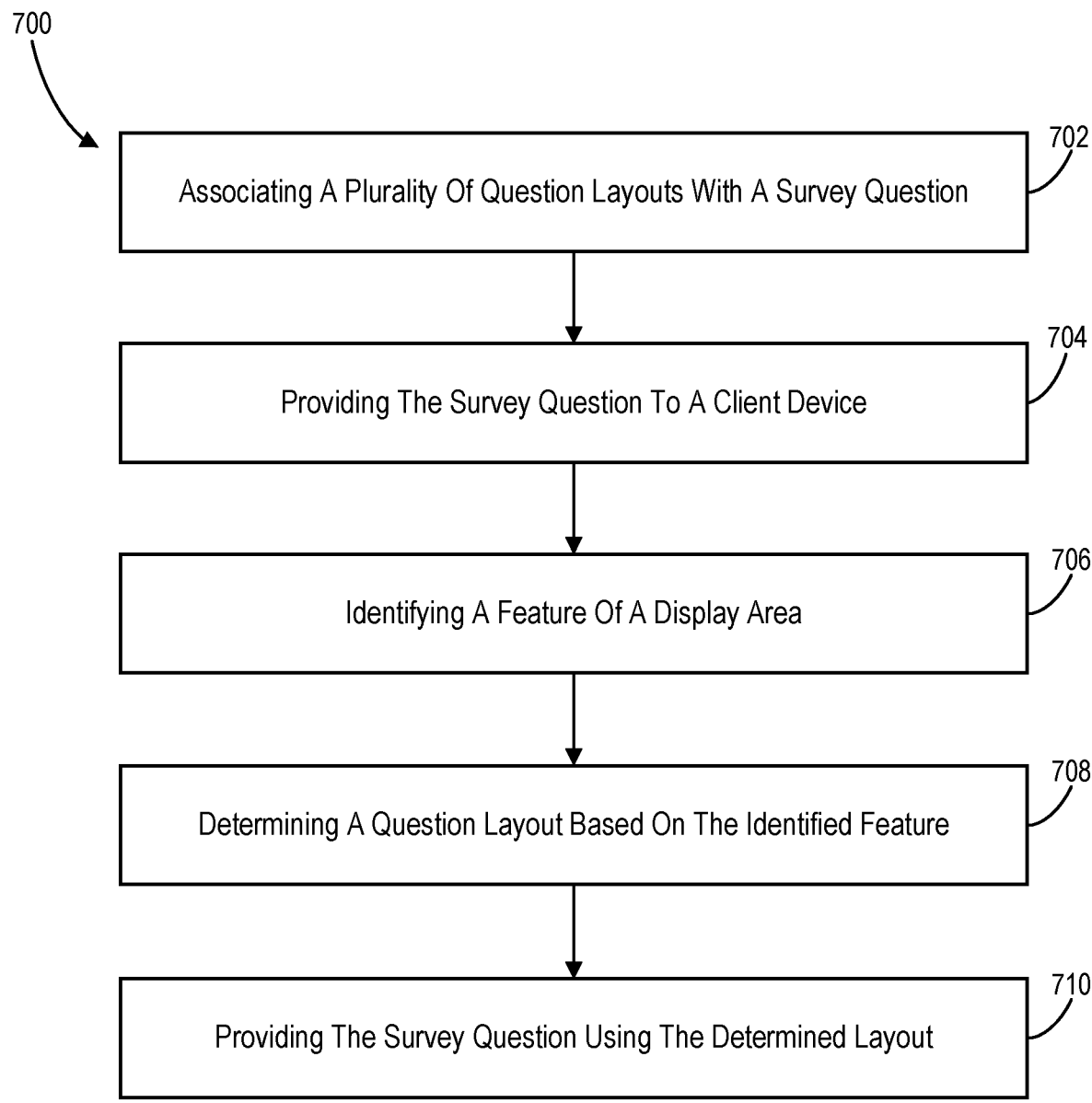
FIG. 7 illustrates a flowchart of a series of acts in a method for providing an electronic survey in accordance with one or more embodiments.

FIGS. 1-6D, the corresponding text, and the examples, provide a number of different systems, devices, and graphical user interfaces for providing survey content to a user 104. In addition to the foregoing, embodiments disclosed herein also can be described in terms of flowcharts comprising acts and steps in a method for accomplishing a particular result. For example, FIG. 7 illustrates a flowchart of exemplary methods in accordance with one or more embodiments disclosed herein. The methods described in relation to FIGS. 7-8 can be performed with less or more steps/acts or the steps/acts can be performed in differing orders. Additionally, the steps/acts described herein can be repeated or performed in parallel with one another or in parallel with different instances of the same or similar steps/acts.

FIG. 7 illustrates a flowchart of an example method 700 for providing electronic survey content to a user in accordance with one or more embodiments disclosed herein. While FIG. 7 illustrates example steps according to one embodiment, other embodiments may omit, add to, reorder, and/or modify any of the steps shown in FIG. 7. One or more steps shown in FIG. 7 may be performed by any of the components illustrated in the system 100 illustrated in FIG. 1. Further, one or more steps of the method 700 may be performed by a client device 102, server device 101, or combination of both.

As illustrated in FIG. 7, the method 700 includes an act 702 of associating a plurality of question layouts with a survey question. For example, act 702 can include associating a plurality of question layouts with a first survey question. In one or more embodiments, for example, act 702 can include associating a plurality of question layouts with a survey question using a CSS class for each of the plurality of layouts. In addition, the method 700 can include generating the plurality of question layouts based on one or more client device features. For example, the method 700 can include accessing a library of client device types, features, and characteristics to generate one or more layouts to associate with the survey question.

Furthermore, and as shown in FIG. 7, the method 700 can include an act 704 of providing the survey question to a client device. In particular, act 704 can include providing, to a client device, the first survey question corresponding to an electronic survey. In addition, providing the first survey question can include providing executable or computer readable code that with the survey question that causes the device to perform one or more functions. Moreover, method 700 can include providing the plurality of layouts to the client device. The plurality of layouts can each comprise one or more instructions that identify how the survey question is presented to the user via the client device.

Furthermore, as illustrated in FIG. 7, the method 700 can include an act 706 of identifying a feature of a display area 706. For instance, act 706 can include identifying a feature of a display area within a graphical user interface of the client device. In one or more embodiments, providing the first survey question to the client device causes the client device to perform the steps of identifying a feature of a display area within a graphical user interface of the client device. Additionally, or alternatively, method 700 can include identifying an input capability of the client device. In one or more embodiments, method 700 can include identifying a characteristic of the first survey question, determining that the characteristic of the first survey question is incompatible with the identified feature of the display area within the graphical user interface, and identifying, in response to determining that the characteristic of the first survey question is incompatible with the identified feature of the display area, the question layout for a reduced version of the first survey question.

As also shown in FIG. 7, the method 700 can include an act 708 of determining a question layout based on the identified feature. In particular, act 708 can include determining a question layout for the first survey question from the plurality of question layouts based on the identified feature of the display area within the graphical user interface of the client device. For example, act 708 can further include identifying a cascading style sheet (CSS) defined within a hyper text markup language (HTML) based on the identified feature of the display area within the graphical user interface.

Additionally, and as illustrated in FIG. 7, the method 700 can include act 710 of providing the survey question using the determined layout. For example, act 710 can include providing the first survey question to a user within the display area in accordance with the determined question layout. Act 710 can further include providing, within the graphical user interface, a selectable option to receive the first survey question in accordance with a different question layout from the determined question layout. Accordingly, act 710 can also include providing, in response to receiving a user selection of the selectable option, the first survey question in accordance with a different question layout from the determined question layout. For example, act 710 can include providing, in response to receiving a user selection of the selectable option, a listing of one or more layouts from the plurality of layouts, and providing, in response to receiving a second user selection of a layout from the listing of one or more layouts, the first survey question in accordance with the selected layout from the listing of one or more layouts.

In addition, method 700 can further include monitoring the feature of the display area within the graphical user interface to detect any changes in the feature of the display area. Moreover, in response to detecting a change in the feature of the display area within the graphical user interface, method 700 can include determining a different question layout for the first survey question from the plurality of question layouts based on the detected change in the feature of the display area, and providing the first survey question to the user within the display area in accordance with the different question layout.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
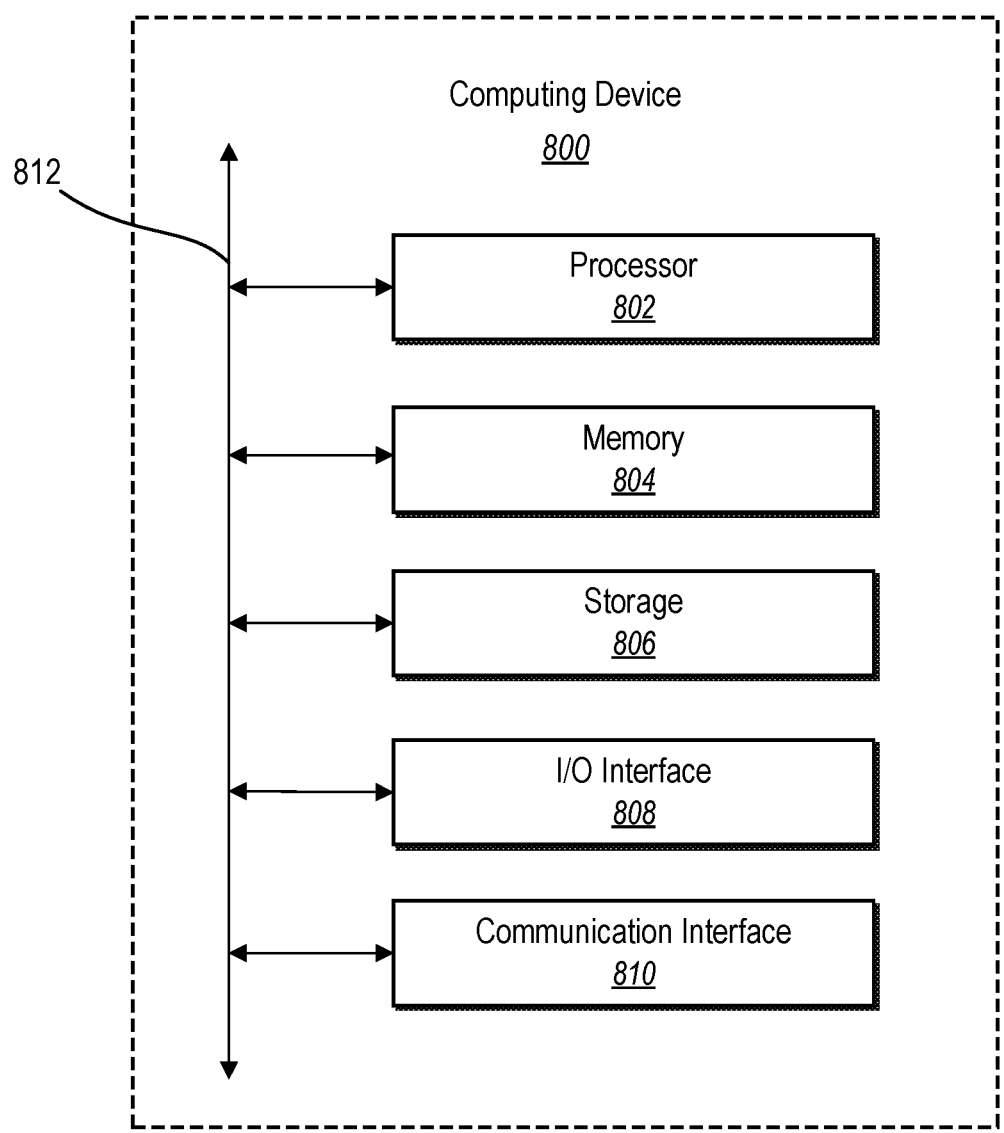
FIG. 8 illustrates a block diagram of a computing device in accordance with one or more embodiments.

FIG. 8 illustrates a block diagram of exemplary computing device 800 that may be configured to perform one or more of the processes described above. One will appreciate that one or more computing devices such as the computing device 800 may implement the server device 101 and/or client device 102. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
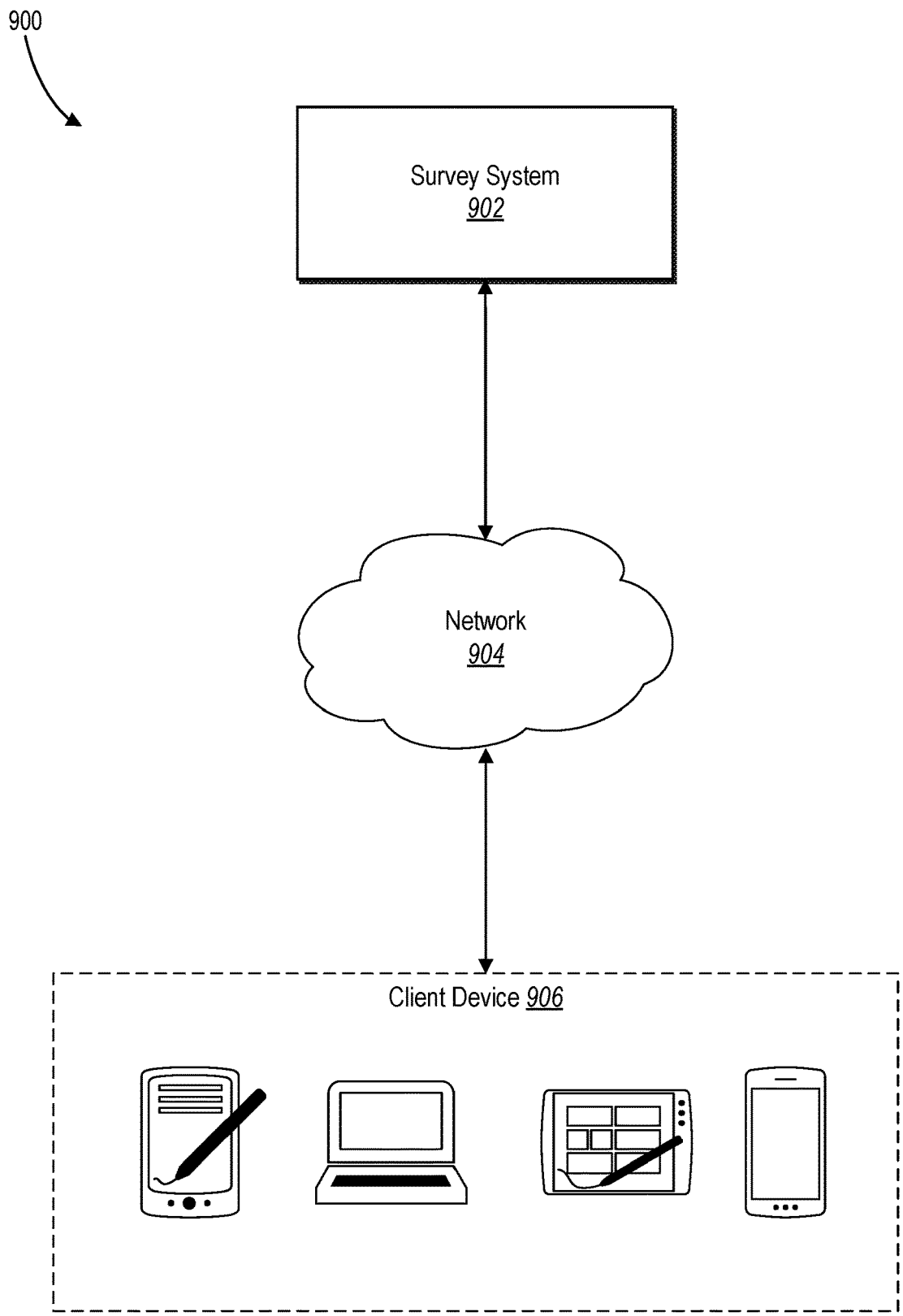
FIG. 9 illustrates a networking environment of a survey system in accordance with one or more embodiments.

FIG. 9 illustrates an example network environment 900 of a survey system 106. Network environment 900 includes a client device 906, and a survey system 902 connected to each other by a network 904. Although FIG. 9 illustrates a particular arrangement of client system 906, survey system 902, and network 904, this disclosure contemplates any suitable arrangement of client device 906, survey system 902, and network 904. As an example and not by way of limitation, two or more of client device 906, and survey system 902 may be connected to each other directly, bypassing network 904. As another example, two or more of client device 906 and survey system 902 may be physically or logically co-located with each other in whole, or in part. Moreover, although FIG. 9 illustrates a particular number of client devices 906, survey systems 902, and networks 904, this disclosure contemplates any suitable number of client devices 906, survey systems 902, and networks 904. As an example and not by way of limitation, network environment 900 may include multiple client devices 906, survey systems 902, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client device 906, and survey system 902 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 8. A client device 906 may enable a network user at client device 906 to access network 904. A client device 906 may enable its user to communicate with other users at other client systems 806.

In particular embodiments, client device 906 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 906 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 906 one or more Hyper Text Markup Language (HTML) files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, survey system 902 may include a variety of servers, sub-systems, programs, modules, logs, and data stores. In particular embodiments, survey system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Survey system 902 may also include suitable components such as network interfaces, security mechanisms, load balancers, failover servers, management-and-network-operations consoles, other suitable components, or any suitable combination thereof.

In particular embodiments, survey system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for providing an electronic survey, the method comprising:
   associating a plurality of question layouts with a first survey question, the plurality of question layouts comprising:
      a first question layout comprising a first visual organization of content from the first survey question and a first response input type; and
      a second question layout comprising a second visual organization of content from the first survey question and a second response input type; and
   providing, to a client device, the first survey question and the plurality of question layouts, wherein providing the first survey question and the plurality of question layouts to the client device causes the client device to:
      identify a characteristic of the client device;
      determine that the first question layout for the first survey question from the plurality of question layouts corresponds to the characteristic of the client device; and
      provide the first survey question in the first visual organization and with the first response input type within a graphical user interface of the client device in accordance with the first question layout.

2. The method as recited in claim 1, wherein:
   identifying the characteristic of the client device comprises determining an input capability of the client device; and
   determining that the first question layout for the first survey question from the plurality of question layouts corresponds to the characteristic of the client device comprises determining the question layout based on the input capability of the client device.

3. The method as recited in claim 1, wherein:
   the first response input type of the first question layout comprises a single-input element; and the second response input type of the second question layout comprises a slider input element.

4. The method as recited in claim 1, wherein:
the first visual organization of the content from the first survey question is a single user interface format that presents the content from the first survey question in a single user interface of the graphical user interface of the client device; and
the second visual organization of the content from the first survey question is a multiple user interface format that presents the content from the first survey question in multiple separate user interfaces of the graphical user interface of the client device.

5. The method as recited in claim 1, wherein providing the first survey question to the client device further causes the client device to:
monitor the characteristic of the client device; and
in response to detecting a change in the characteristic of the client device:
determine that the second question layout for the first survey question from the plurality of question layouts corresponds to the detected change in the characteristic of the client device; and
provide the first survey question within the graphical user interface of the client device in accordance with the second question layout.

6. The method as recited in claim 5, wherein:
determining that the first question layout for the first survey question corresponds to the characteristic of the client device comprises identifying a first cascading style sheet (CSS) class defined within a hyper text markup language (HTML); and
determining that the second question layout for the first survey question corresponds to the change in the characteristic of the client device comprises identifying a second CSS class defined within the HTML presentation based on the change in the characteristic of the client device.

7. The method as recited in claim 1, wherein:
identifying the characteristic of the client device comprises determining a user input capability of the client device; and
determining that the first question layout for the first survey question from the plurality of question layouts corresponds to the characteristic of the client device comprises determining that the second response input type of the second question layout is incompatible with the user input capability of the client device.

8. The method as recited in claim 1, wherein providing the first survey question and the plurality of question layouts to the client device further causes the client device to provide, within the graphical user interface, a selectable option to display the first survey question in accordance with a different question layout than the first question layout.

9. The method as recited in claim 8, wherein providing the first survey question and the plurality of question layouts to the client device further causes the client device to provide, in response to receiving a user selection of the selectable option, the first survey question in accordance with a different question layout than the first question layout.

10. The method as recited in claim 1, wherein:
identifying the characteristic of the client device comprises determining a model of the client device; and
determining that the first question layout for the first survey question corresponds to the characteristic of the client device comprises identifying the first question layout based on determining that the first question layout corresponds to the model of the client device.

11. A non-transitory computer readable storage medium comprising instructions that, when executed by at least one processor, cause a computer device to:
associate a plurality of question layouts with a first survey question, the plurality of question layouts comprising:
a first question layout comprising a first visual organization of content from the first survey question and a first response input type; and
a second question layout comprising a second visual organization of content from the first survey question and a second response input type; and
provide, to a client device, the first survey question and the plurality of question layouts, wherein providing the first survey question and the plurality of question layouts to the client device causes the client device to:
identify a characteristic of the client device;
determine that the first question layout for the first survey question from the plurality of question layouts corresponds to the characteristic of the client device; and
provide the first survey question in the first visual organization and with the first response input type within a graphical user interface of the client device in accordance with the first question layout.

12. The non-transitory computer readable storage medium as recited in claim 11, wherein:
identifying the characteristic of the client device comprises determining an input capability of the client device; and
determining that the first question layout for the first survey question from the plurality of question layouts corresponds to the characteristic of the client device comprises determining the question layout based on the input capability of the client device.

13. The non-transitory computer readable storage medium as recited in claim 11, wherein:
the first response input type of the first question layout comprises a single-input element; and
the second response input type of the second question layout comprises a slider input element.

14. The non-transitory computer readable storage medium as recited in claim 11, wherein:
the first visual organization of the content from the first survey question is a single user interface format that presents the content from the first survey question in a single user interface of the graphical user interface of the client device; and
the second visual organization of the content from the first survey question is a multiple user interface format that presents the content from the first survey question in multiple separate user interfaces of the graphical user interface of the client device.

15. The non-transitory computer readable storage medium as recited in claim 11, wherein:
identifying the characteristic of the client device comprises determining a user input capability of the client device; and
determining that the first question layout for the first survey question from the plurality of question layouts corresponds to the characteristic of the client device comprises determining that the second response input type of the second question layout is incompatible with the user input capability of the client device.

16. A system for providing an electronic survey, the system comprising:

at least one processor; and a non-transitory computer readable storage medium storing instructions thereon that, when executed by at least one processor, cause the system to:

associate a plurality of question layouts with a first survey question, the plurality of question layouts comprising:

a first question layout comprising a first visual organization of content from the first survey question and a first response input type; and a second question layout comprising a second visual organization of content from the first survey question and a second response input type; and provide, to a client device, the first survey question and the plurality of question layouts, wherein providing the first survey question and the plurality of question layouts to the client device causes the client device to:

identify a characteristic of the client device;

determine that the first question layout for the first survey question from the plurality of question layouts corresponds to the characteristic of the client device; and provide the first survey question in the first visual organization and with the first response input type within a graphical user interface of the client device in accordance with the first question layout.

17. The system as recited in claim 16, wherein:

identifying the characteristic of the client device comprises determining an input capability of the client device; and determining that the first question layout for the first survey question from the plurality of question layouts corresponds to the characteristic of the client device comprises determining the question layout based on the input capability of the client device.

18. The system as recited in claim 16, wherein:

the first response input type of the first question layout comprises a single-input element; and the second response input type of the second question layout comprises a slider input element.

19. The system as recited in claim 16, wherein:

the first visual organization of the content from the first survey question is a single user interface format that presents the content from the first survey question in a single user interface of the graphical user interface of the client device; and the second visual organization of the content from the first survey question is a multiple user interface format that presents the content from the first survey question in multiple separate user interfaces of the graphical user interface of the client device.

20. The system as recited in claim 16, wherein:

identifying the characteristic of the client device comprises determining a user input capability of the client device; and determining that the first question layout for the first survey question from the plurality of question layouts corresponds to the characteristic of the client device comprises determining that the second response input type of the second question layout is incompatible with the user input capability of the client device.

* * * * *